(12) United States Patent
Wang et al.

(10) Patent No.: US 12,245,276 B2
(45) Date of Patent: Mar. 4, 2025

(54) SIGNALING LISTEN-BEFORE-TALK PARAMETERS

(71) Applicant: Telefonaktiebolaget LM Ericsson (publ), Stockholm (SE)

(72) Inventors: Min Wang, Luleå (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 17/635,089

(22) PCT Filed: Aug. 13, 2020

(86) PCT No.: PCT/EP2020/072813
§ 371 (c)(1),
(2) Date: Feb. 14, 2022

(87) PCT Pub. No.: WO2021/028553
PCT Pub. Date: Feb. 18, 2021

(65) Prior Publication Data
US 2022/0304058 A1 Sep. 22, 2022

Related U.S. Application Data

(60) Provisional application No. 62/886,599, filed on Aug. 14, 2019.

(51) Int. Cl.
H04W 72/04 (2023.01)
H04W 72/0446 (2023.01)
(Continued)

(52) U.S. Cl.
CPC .......... *H04W 74/0816* (2013.01); *H04W 72/0446* (2013.01); *H04W 72/56* (2023.01);
(Continued)

(58) Field of Classification Search
CPC .......... H04W 74/0816; H04W 74/006; H04W 74/0833; H04W 74/0866; H04W 74/0808;
(Continued)

(56) References Cited

U.S. PATENT DOCUMENTS

2016/0278078 A1* 9/2016 Cheng ............... H04W 72/0446
2017/0339588 A1* 11/2017 Moon ................... H04W 24/08
(Continued)

FOREIGN PATENT DOCUMENTS

| EP | 3499976 A1 | 6/2019 |
|---|---|---|
| EP | 3541139 A1 | 9/2019 |
| WO | 2018088422 A1 | 5/2018 |

OTHER PUBLICATIONS

International Search Report and Written Opinion of the International Searching Authority, PCT/EP2020/072813, mailed Oct. 6, 2020, 16 pages.
Samsung, "LBT types in NR-U", Document: R2-1907637, 3GPP TSG-RAN WG2 Meeting #106, Reno, USA, May 13-17, 2019, 2 pages.
(Continued)

*Primary Examiner* — Mahbubul Bar Chowdhury
(74) *Attorney, Agent, or Firm* — Sage Patent Group

(57) ABSTRACT

A UE and a method of operating the UE is provided. The method includes receiving an indication for determining a set of channel access parameters from a base station node. The method includes responsive to receiving the indication in a DCI message, determining a first set of channel access parameters based on the request. The method includes responsive to receiving the indication in a RAR message, determining a second set of channel access parameters based on the request. A RAN node and method of operating the RAN node is also provided. The RAN node transmits an indication for determining a set of channel access parameters to a UE wherein when transmitted in a DCI message,
(Continued)

the UE is requested to determine a first set of channel access parameters, and/or when transmitted in a RAR message, the UE is requested to determine a second set of channel access parameters.

25 Claims, 15 Drawing Sheets

(51) Int. Cl.
  *H04W 72/56* (2023.01)
  *H04W 74/00* (2009.01)
  *H04W 74/08* (2009.01)
  *H04W 74/0816* (2024.01)
  *H04W 74/0833* (2024.01)
(52) U.S. Cl.
  CPC ..... *H04W 74/006* (2013.01); *H04W 74/0833* (2013.01); *H04W 74/0866* (2013.01)
(58) Field of Classification Search
  CPC ........... H04W 74/008; H04W 72/0446; H04W 72/56; H04W 72/23; H04W 16/14
  See application file for complete search history.

(56) References Cited

U.S. PATENT DOCUMENTS

| | | | |
|---|---|---|---|
| 2018/0242360 A1* | 8/2018 | Noh | H04L 1/1657 |
| 2019/0174548 A1* | 6/2019 | Jiang | H04W 52/02 |
| 2019/0274054 A1* | 9/2019 | Salem | H04L 12/189 |
| 2020/0053798 A1* | 2/2020 | Tsai | H04W 72/23 |
| 2020/0059969 A1* | 2/2020 | Agiwal | H04W 72/23 |
| 2021/0307083 A1* | 9/2021 | Wu | H04L 5/0053 |
| 2022/0279579 A1* | 9/2022 | He | H04W 72/0446 |
| 2022/0377791 A1* | 11/2022 | Nogami | H04W 74/006 |

OTHER PUBLICATIONS

Ericsson, "Discussions on transmission opportunities of Msg3 in NR-U", Document: R2-1907594, 3GPP TSG-RAN WG2 Meeting #106, Reno, USA, May 13-17, 2019, 5 pages.
3GPP TS 38.321, "Medium Access Control (MAC) protocol specification", (Release 15), V15.6.0, Valbonne, France, Jun. 2019, 78 pages.
3GPP TS 38.213, "Physical layer procedures for control", (Release 15), V15.6.0, Valbonne, France, Jun. 2019, 107 pages.
3GPP TR 38.889, "Study on NR-based access to unlicensed spectrum", (Release 16), V16.0.0, Valbonne, France, Dec. 2018, 119 pages.

* cited by examiner

| R | TIMING ADVANCE COMMAND | | OCT 1 |
| --- | --- | --- | --- |
| TIMING ADVANCE COMMAND | | UL GRANT | OCT 2 |
| UL GRANT | | | OCT 3 |
| UL GRANT | | | OCT 4 |
| UL GRANT | | | OCT 5 |
| TEMPORARY C-RNTI | | | OCT 6 |
| TEMPORARY C-RNTI | | | OCT 7 |

Figure 7

SIGNALING LISTEN-BEFORE-TALK PARAMETERS

CROSS REFERENCE TO RELATED APPLICATIONS

This application is a 35 U.S.C. § 371 national stage application of PCT International Application No. PCT/EP2020/072813 filed on Aug. 13, 2020, which in turn claims domestic priority to U.S. Provisional Patent Application No. 62/886,599, filed on Aug. 14, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Next generation systems are expected to support a wide range of use cases with varying requirements ranging from fully mobile devices to stationary Internet of Things (IoT) or fixed wireless broadband devices. The traffic pattern associated with many use cases may consist of short or long bursts of data traffic with varying length of waiting period in between (e.g., an inactive state). In new radio (NR), both license assisted access and standalone unlicensed operation may be supported in 3GPP. Hence the procedure of PRACH transmission and/or SR transmission in unlicensed spectrum may be investigated in 3GPP. In the following, NR-U (NR in unlicensed spectrum) and channel access procedure for an unlicensed channel based on LBT is introduced.
NR-U Introduction In order to handle the ever increasing data demanding, NR has and is considering both licensed and unlicensed spectrum. 3GPP defined a study item on NR-based Access to Unlicensed Spectrum that was approved at RAN-77. In this study item, compared to the LTE LAA. NR-U also needs to support DC and standalone scenarios, where the MAC procedures including RACH and scheduling procedure on unlicensed spectrum are subject to the LBT failures. There was no such restriction in LTE LAA, since there was licensed spectrum LAA scenario so the RACH and scheduling related signaling may be transmitted on the licensed spectrum instead of unlicensed spectrum.

In the unlicensed spectrum, for discovery reference signal (DRS) transmission such as PSS/SSS (primary synchronization signal/secondary synchronization signal), PBCH (physical broadcast channel), CSI-RS (channel state information reference signal), control channel transmission such as PUCCH/PDCCH (physical upload control channel/physical download control channel), physical data channel such as PUSCH/PDSCH (physical uplink shared channel/physical downlink shared channel), and uplink sounding reference signal such as SRS (sounding reference signal) transmission, channel sensing should be applied to determine the channel availability before the physical signal is transmitted using the channel.

The RRM (radio resource management) procedures in NR-U would be generally rather similar as in LAA (license assisted access), since NR-U is aiming to reuse LAA/eLAA/feLAA (LAA/Enhanced LAA/Further Enhanced LAA) technologies as much as possible to handle the coexistence between NR-U and other legacy RATs (Radio Access Technologies. RRM measurements and report comprising special configuration procedure with respect the channel sensing and channel availability.

Channel access/selection for LAA was one of important aspects for co-existence with other RATs such as Wi-Fi. For instance, LAA has aimed to use carriers that are congested with Wi-Fi.

In the licensed spectrum, the UE may measure Reference Signal Received Power (RSRP), and Reference Signal Received Quality (RSRQ) of the downlink radio channel (e.g. SSE, CSI-RS), and provides the measurement reports to its serving eNB/gNB. However, these measurements do not reflect the interference strength on the carrier. Another metric Received Signal Strength Indicator (RSSI) can serve for such purpose. At the eNB/gNB side, deriving RSSI is possible based on the received RSRP and RSRQ reports, however, this requires that the reports are available. Due to LBT (listen before talk) failures, some reports in terms of RSRP or RSRP may be blocked (which can be blocked either due to that the reference signal transmission (DRS) is blocked in the downlink or the measurement report is blocked in the uplink). Hence, the measurements in terms of RSSI are very useful. The RSSI measurements together with the time information concerning when and how long of time that UEs have made the measurements can assist the gNB/eNB to detect a hidden node. Additionally, the gNB/eNB can measure the load situation of the carrier which is useful for the network to prioritize some channels for load balance and channel access failure avoidance purposes.

LTE LAA has defined supporting measurements of averaged RSSI and channel occupancy) for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).
COT Sharing in NR-U For a node NR-U gNB/UE, LTE-LAA eNB/UE, or Wi-Fi AP/STA)) to be allowed to transmit in unlicensed spectrum (e.g., 5 GHz band), the node may need to perform a clear channel assessment (CCA). This CCA procedure may include sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium to be idle, the node may be allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as a COT (Channel Occupancy Time).

In Wi-Fi, feedback of data reception acknowledgements (ACKs) may be transmitted without performing clear channel assessment. Preceding feedback transmission, a small time duration (called SIFS) is introduced between the data transmission and the corresponding feedback which does not include actual sensing of the channel. In 802.11, the SIFS period (16 μs for 5 GHz OFDM PHYs) is defined as:

aSIFSTime=aRxPHYDelay+aMACProcessingDelay+
aRxTxTurnaroundTime where aRxPHYDelay defines the duration needed by the PHY layer to deliver a packet to the MAC layer, aMACProcessingDelay defines the duration that the MAC layer needs to trigger the PHY layer transmitting a response, and aRxTxTurnaroundTime defines the duration needed to turn the radio from reception into transmit mode Thus, the SIFS duration is used to accommodate for the hardware delay to switch the direction from reception to transmission.

For NR in unlicensed bands (NR-U), a similar gap to accommodate for the radio turnaround time may be allowed. For example, this similar gap will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between DL and UL transmission is less than or equal to 16 us. Operation in this manner is typically called "COT sharing." An example on COT sharing is illustrated in FIG. 1.

When a UE accesses a medium via category 4 (Cat-4 LBT) with a configured grant outside of a gNB COT, it may be possible for the UE and the gNB to share the UE acquired COT to schedule DL data to the same UE. UE COT information can be indicated in UCI such as CG-UCI for a configured grant PUSCH resources. An example of this is illustrated in FIG. 2. UE COT information can be indicated in UCI such as CG-UCI for configured grant PUSCH resources.

Channel Access Procedure in NR-U

Listen-before-talk (LBT) is designed for unlicensed spectrum co-existence with other RATs. In this mechanism, a radio device applies a clear channel assessment (CCA) check (i.e. channel sensing) before any transmission. The CCA check may involve energy detection (ED) over a time period compared to a certain energy detection threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes are defined for differentiation of channel access priorities between services using contention window size (CWS) and MCOT duration.

As described in 3GPP TR 38.889 [1], the channel access schemes for NR-based access for unlicensed spectrum can be classified into the following categories:

Category 1: Immediate Transmission after a Short Switching Gap

This is used for a transmitter to immediately transmit after a UL/DL switching gap inside a COT.

The switching gap from reception to transmission is to accommodate the transceiver turnaround time and is no longer than 16 μs.

Category 2: LBT without Random Back-Off

The duration of time that the channel is sensed to be idle before the transmitting entity transmits is deterministic.

Category 3: LBT with Random Back-Off with a Contention Window of Fixed Size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with Random Back-Off with a Contention Window of Variable Size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

RACH Procedures in NR Unlicensed Spectrum

The four step random access (RA) has been the current standard for legacy systems such as LTE and NR Rel-15. A two-step procedure has been proposed where the UL messages (PRACH+Msg3) are sent simultaneously and similarly the two DL messages (e.g. time advance command in RAR and contention resolution information) are sent as a simultaneous response in the DL. In the legacy four step procedure, one of the main usage of the first two messages is to obtain UL time alignment for the UE. In many situations, e.g. in small cells or for stationary UEs, this may not be needed since either a TA=0 will be sufficient (small cells) or a stored TA value from the last RA could serve also for the current RA (stationary UE). In future radio networks it can be expected that these situations are common, both due to dense deployments of small cells and a great number of e.g. stationary IoT devices. A possibility to skip the message exchange to obtain the TA value would lead to reduced RA latency and would be beneficial in several use cases, for example when transmitting infrequent small data packets. On the other hand, the two step RA will consume more resources since it uses contention based transmission of the data. This means that the resources that are configured for the data may often be unused.

When both the four-step and two-step RA are configured in a cell (and for the UE), the UE may choose the preamble from one specific set if it wants to do a four-step RA, and from another set if it wants to do a two-step RA. Hence a preamble partition is done to distinguish between four-step and two-step RA.

4 Step Random Access

The 4 step RA has been used in LTE and is also proposed as baseline for NR. The principle of this procedure is shown in FIG. 3. The UE may randomly select a preamble which is transmitted.

When the eNB detects the preamble, the eNB may estimate the Timing alignment (TA) the UE should use in order to obtain UL synch at the eNB. The eNB may respond with the TA, a grant for Msg3. In Msg3, the UE transmits its identifier, and the eNB responds by acknowledging the UE id in Msg 4. The Msg 4 gives contention resolution, i.e. only one UE's identifier will be sent even if several UEs have used the same preamble (and Msg 3) simultaneously. In LTE, the 4 step RA cannot be completed in less than 14 ms/TTI/SF.

2 Step Random Access

The 2 step RA gives much shorter latency than the ordinary 4 step RA. In the 2 step RA the preamble and a message corresponding to Message 3 in the 4 step RA are transmitted in the same or in two subsequent sub frames. The Msg3 is sent on a resource dedicated to the specific preamble. This means that both the preamble and the Msg3 face contention but contention resolution in this case means that either both preamble and Msg3 are sent without collision or both collide. The 2-step procedure is depicted in FIG. 4.

Upon successful reception of the preamble and Msg 3, the eNB may respond with a TA (which by assumption should not be needed or just give very minor updates) and a Msg 4 for contention resolution.

An issue that may occur if the UE TA is bad (e.g. using TA=0 in a large cell or using an old TA even though the UE has moved) is that only the preamble can be detected by the eNB. A transmission with an inaccurate TA value may interfere transmissions from other UEs in the same cell. Additionally, the preamble signal has higher detection probability than the normal data due to its design pattern. In this case the NW may reply with an ordinary RAR giving the UE an opportunity to transmit an ordinary Msg3 on a scheduled resource. This is a fallback to four step RA.

A gNB that momentarily detects more than one random access preamble may select to separate its responses in more than one MAC PDU, or it may select to concatenate its responses into one and same MAC PDUs, see FIG. 5, which illustrates such a concatenated MAC PDU.

If the gNB cannot handle all detected preambles it may send a backoff indicator (BI) to certain preambles, as illustrated as subPDU #1 in the leftmost part of FIG. 5. If the gNB detects a preamble that is used to request SI it may just acknowledge reception, as illustrated as subPDU #2 in FIG. 5.

The gNB may select to acknowledge with a RAR, which is where the Msg3 occurs. The subheader corresponding to a RAR consists of three header fields E/T/RAPID as illustrated in FIG. 6.

Apart from the field of reserved R bits, the payload corresponding to a RAR consists of three fields, as illustrated in FIG. 7: Timing Advance Command, UL Grant and Temporary C-RNTI. Particularly fields R and UL Grant are specified:
- R: Reserved bit, set to "0";
- UL Grant: The Uplink Grant field indicates the resources to be used on the uplink in TS 38.213. The size of the UL Grant field is 27 bits The UL grant in RAR schedules a PUSCH transmission from the UE (Msg3 PUSCH). The contents of the RAR UL grant, starting with the MSB and ending with the LSB, are given in the Table 1 below:

TABLE 1

Random Access Response Grant Content field size

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

SUMMARY

The embodiments herein are described in the context of NR unlicensed spectrum (NR-U). However, the embodiments are also applicable to other unlicensed operation scenarios such as LTE LAA, eLAA, feLAA, MuLteFire, etc.

According to some embodiments of inventive concepts, a method is provided to operate a user equipment (UE) in a communication network. The method includes receiving an indication for determining a set of channel access parameters from a base station node. The method further includes responsive to receiving the indication in a downlink control information, DCI, message, determining a first set of channel access parameters based on the request. The method further includes responsive to receiving the indication in a random access response, RAR, message, determining a second set of channel access parameters based on the request.

According to other embodiments of inventive concepts, a wireless device performing analogous operations is provided.

According to further embodiments of inventive concepts, a method of operating a radio access network (RAN) node in a communication network is provided. The method includes transmitting an indication for determining a set of channel access parameters to a user equipment (UE). The method further includes wherein when the indication is transmitted in a downlink control information, DCI, message, the UE is requested to determine a first set of channel access parameters, and/or when the indication is transmitted in a random access response, RAR, message, the UE is requested to determine a second set of channel access parameters.

According to yet other embodiments of inventive concepts, a RAN node performing analogous operations is provided.

For some embodiments, it will be assumed that the baseline channel access procedure for the random access channel (RACH) transmission is category 4 LBT. Using a fixed LBT setting without adaptability may not work well with channel occupancy time (COT) sharing, i.e. when two (or more) transmitters (or two or more transmissions) share the same COT by taking turns.

Further embodiments comprise signaling methods for LBT parameters for Msg3 transmissions in a RA procedure in NR-U. The advantages include facilitating COT sharing between gNB and UE by signaling the LBT parameters that should be used by the UE to perform the channel sensing prior to the Msg3 transmission.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts, in the drawings:

FIG. 7 is an illustration of MAC RAR;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 8:
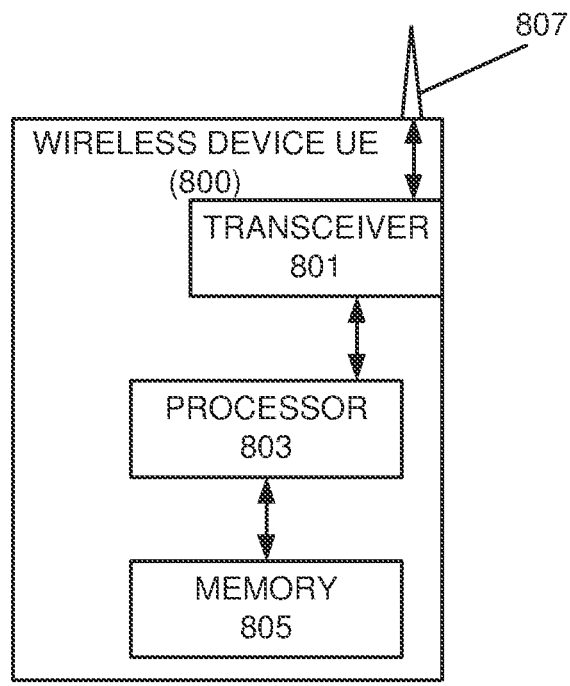
FIG. 8 is a block diagram illustrating a mobile terminal UE according to some embodiments of inventive concepts.

FIG. 8 is a block diagram illustrating elements of a wireless device UE 800 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device UE 800 may be provided, for example, as discussed below with respect to wireless device 4110 of FIG. 13.) As shown, wireless device UE 800 may include an antenna 807 (e.g., corresponding to antenna 4111 of FIG. 13), and transceiver circuitry 801 (also referred to as a transceiver, e.g., corresponding to interface 4114 of FIG. 13) including a transmitter and a receiver configured to provide uplink and downlink radio communications with a base station(s) (e.g., corresponding to network node 4160 of FIG. 13) of a radio access network. Wireless device UE 800 may also include processing circuitry 803 (also referred to as a processor, e.g., corresponding to processing circuitry 4120 of FIG. 13) coupled to the transceiver circuitry, and memory circuitry 805 (also referred to as memory, e.g., corresponding to device readable medium 4130 of FIG. 13) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Wireless device UE 800 may also include an interface (such as a user interface) coupled with processing circuitry 803, and/or wireless device UE may be incorporated in a vehicle.

As discussed herein, operations of wireless device UE may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) and/or to receive communications through transceiver circuitry 801 from a RAN node over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to wireless devices).

Figure 9:
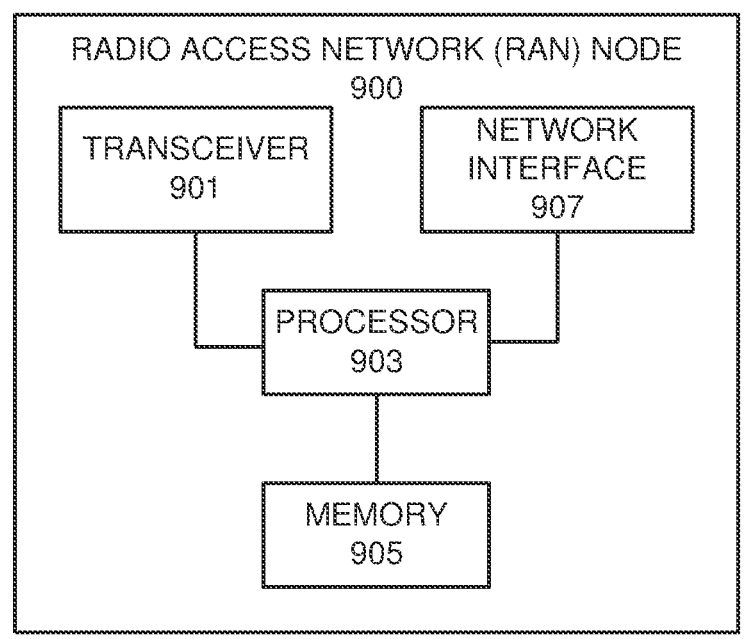
FIG. 9 is a block diagram illustrating a radio access network RAN node (e.g., a base station eNB/gNB) according to some embodiments of inventive concepts.

FIG. 9 is a block diagram illustrating elements of a radio access network RAN node 900 (also referred to as a network node, base station, eNodeB/eNB, gNodeB/gNB, etc.) of a Radio Access Network (RAN) configured to provide cellular communication according to embodiments of inventive concepts. (RAN node 900 may be provided, for example, as discussed below with respect to network node 4160 of FIG. 13.) As shown, the RAN node may include transceiver circuitry 901 (also referred to as a transceiver, e.g., corresponding to portions of interface 4190 of FIG. 13) including a transmitter and a receiver configured to provide uplink and downlink radio communications with mobile terminals. The RAN node may include network interface circuitry 907 (also referred to as a network interface, e.g., corresponding to portions of interface 4190 of FIG. 13) configured to provide communications with other nodes (e.g., with other base stations) of the RAN and/or core network CN. The network node may also include a processing circuitry 903 (also referred to as a processor, e.g., corresponding to processing circuitry 4170) coupled to the transceiver circuitry, and a memory circuitry 905 (also referred to as memory, e.g., corresponding to device readable medium 4180 of FIG. 13) coupled to the processing circuitry 903. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the RAN node may be performed by processing circuitry 903, network interface 907, and/or transceiver 901. For example, processing circuitry 903 may control transceiver 9 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

The baseline channel access procedure for the random access channel (RACH) transmission is category 4 LBT. Using a fixed LBT setting without adaptability may not work well with channel occupancy time (COT) sharing, i.e. when two (or more) transmitters (or two or more transmissions) share the same COT by taking turns.

In RAN2 #105bis, RAN2 has made discussions on how to enhance transmission opportunities for Msg3. There are two proposals discussed. These proposals are a) multiple RAR, and b) multiple grants in RAR. There may also be the possibility that retransmission can be considered additional opportunity. Some think additional transmissions shall not be consecutive. Another possibility is that if MSG3 shares COT with MSG2 then additional transmissions may not be. Several parties pointed out that RAR need to be processed (=time). Another party thinks that if there is a significant gap, LBT needs to be done also within the COT.

Whether Msg3 can share a COT with Msg2 so that Cat 4 LBT can be avoided for Msg3 has been initially discussed in RAN2. RAN2 sent a LS (1905444) to RAN1 informing of RAN2 agreements.

Accordingly, in RAN1 #97, RAN1 agreed to facilitate COT sharing between Msg2 and Msg3: LBT category for msg 3 initial transmission is provided to the UE in RAR. Multiple Msg3 transmit (tx) opportunities with a single or multiple RARs in the time domain is feasible from a RAN1 perspective but there is no consensus at this time in RAN1 to support this. RAN1 will continue discussions on the support of multiple Msg3 tx opportunities.

Thus, the LBT category for Msg3 initial transmission may be provided to the UE in RAR. When it is feasible for Msg3 to share the DL COT initiated by the gNB with the DL transmission of Msg2, the gNB can decide LBT category for Msg3 depending on the gap duration (according to the Table 7.2.1.3.1-3 in TR 38.889). In other words, the LBT category is determined based on below conditions:

Category 1 immediate transmission for Msg3 if the gap is not more than 16 us

Category 2 LBT for Msg3 if the gap is not more than 25 us

However, there may be cases where it is not feasible to apply COT sharing between Msg2 and Msg3 since there is no other DL transmission that can be used to occupy the gap between the end of the DL transmission to the beginning of the Msg3 transmission for a UE. In such scenarios, the UE shall apply Category 4 LBT.

In addition, the gNB needs to signal LBT category for UL data transmission with a dynamic grant. In this scenario, LBT category is signalled in DCI. One method for signaling LBT category related parameters is using PUSCH data transmission in the DCI. The channel access mechanism for the UL transmission depends on both the channel access priority class of the traffic and the COT initiation or COT sharing situation. This information may be indicated somehow to the UE. Before describing the LBT parameters signalling details, the possible channel access cases that can occur at the UE shall be discussed.

Table 1 shows that three parameters should be indicated to the UE: LBT category, channel access priority class, and if CP extension is needed. The channel access priority class is used to make sure that the data sent by the UE follows the same or higher priority as the one used to initiate the COT. To minimize the unlicensed access specific parameters in the DCI and following the footsteps of signaling the time resources assignment, those three parameters can be jointly encoded and defined as an RRC configured channel access profile table. The indexed row may define LBT category, channel access priority class, and if CP extension is needed. The channel access profile field value m of the DCI provides a row index m+1 to the allocated table. Table 2 provides the table that include all the possible channel access profiles corresponding to the cases listed in Table 1.

TABLE 1

UL channel access mechanisms in/outside gNB initiated COT

| | Required LBT category | Channel access priority class indication | UE behaviour | Notes |
|---|---|---|---|---|
| UE initiated COT | CAT4 Sensing | NO | UE performs CAT4 LBT before the start of the scheduled transmission | No need to indicate the channel access priority class. The UE can be configured with QCI to channel access priority class mapping as in feLAA. |

TABLE 1-continued

UL channel access mechanisms in/outside gNB initiated COT

| | Required LBT category | Channel access priority class indication | UE behaviour | Notes |
|---|---|---|---|---|
| DL to UL switch in a shared COT initiated by the gNB | CAT1 immediate transmission | Yes | UE transmits immediately at the first scheduled symbol. No special behaviour from the UE is needed such as puncturing or CP extension | This can only happen in case of DL to UL switch. gNB guarantees that the gap is less than or equal 16 us. |
| | CAT2 16 us Sensing | Yes | UE performs the LBT immediately before the first scheduled symbol | Only applicable for gaps equal to 16 us when switching from DL to UL case. gNB guarantees that he gap is equal 16 us. |
| | CAT2 25 us Sensing | Yes | UE performs the LBT immediately before the first scheduled symbol | Works for both shared COT and pause txOP for the DL to UL switch. The gap in this case can be 25 us or larger. |
| UL to UL switch in a shared COT initiated by the gNB | CAT2 25 us Sensing | yes | First symbol of the scheduled PUSCH is needs to be extended | Gap should be exactly 25 us and not longer. |

TABLE 2

RRC configured Chnnel access profiles

| Row index | LBT category | CP extension | Channel access priority class |
|---|---|---|---|
| 1 | none | 0 | 0 |
| 2 | none | 0 | 1 |
| 3 | none | 0 | 2 |
| 4 | none | 0 | 3 |
| 5 | Cat2__16 us | 0 | 0 |
| 6 | Cat2__16 us | 0 | 1 |
| 7 | Cat2__16 us | 0 | 2 |
| 8 | Cat2__16 us | 0 | 3 |
| 9 | Cat2__25 us | 0 | 0 |
| 10 | Cat2__25 us | 0 | 1 |
| 11 | Cat2__25 us | 0 | 2 |
| 12 | Cat2__25 us | 0 | 3 |
| 13 | Cat2__25 us | 1 | 0 |
| 14 | Cat2__25 us | 1 | 1 |
| 15 | Cat2__25 us | 1 | 2 |
| 16 | Cat2__25 us | 1 | 3 |
| 17 | CAT 4 | 0 | — |

If the concept of channel access profile is supported in the 3GPP for signaling LBT parameters in the DCI, then the 3GPP may also support to apply similar concept for signaling LBT parameters in the RAR for Msg3 transmission.

However, the exact same channel access profile table as shown in Table 2 can not be equally applied for Msg3, since that would require 5 bits for LBT parameters in the RAR. This would lead to RAR format being changed as more bits may be also required for byte alignment purpose. This is not efficient, since that may affect the coverage performance for the RAR.

The inventors realized that only part of the table 2 entries are applicable for Msg3 channel access. For example, the 16 us Category 2 LBT is not applicable for Msg3 since Msg3 typically has a small size, meaning its transmission will be unlikely beyond the MCOT of the DL COT initiated by the gNB with Msg2 transmission. In such a case, applying 25 us Category 2 LBT for Msg3 may be sufficient.

The inventive concepts described herein provide signaling methods for LBT parameters for Msg3 transmissions in a RA procedure in NR-U. The advantages include facilitating COT sharing between gNB and UE by signaling the LBT parameters that should be used by the UE to perform the channel sensing prior to the Msg3 transmission.

The embodiments herein are described in the context of NR unlicensed spectrum (NR-U). However, the embodiments are also applicable to other unlicensed operation scenarios such as LTE LAA, eLAA, feLAA, MuLteFire, etc.

To aid in overcoming the above described problems related to COT sharing between the gNB and UE in a gNB initiated COT for subsequent Msg3 transmission initiated by the UE, the gNB should inform the UE about the LBT category, LBT priority class, and possibly other channel access related parameters via the RAR message. Otherwise COT sharing between Msg2 and Msg3 is not possible.

A set of channel access parameters includes a plurality of identifiers, each identifier associated with a LBT category preceding the transmission (e.g., CAT4, CAT2, or no LBT). The set of channel access parameters may optionally include: a cyclic prefix (CP) extension: indication if the UE is expected to perform CP extension of the first symbol of the scheduled PUSC; a Priority Group, and an energy detection (ED) threshold. The priority group in one embodiment is linked to one or more of the following:

Specific one or set of LBT priority class
Specific one or set of logical channels
Specific one or set of QCI values.

Each set of channel access parameters may be structured in the form of a table. Thus, a basic table for selection of channel access profile may be signaled by the gNB to UE. In another embodiment, the tables are specified in specifications and hence does not need to be signaled from the gNB to the UE as the tables may be stored in the UE In one embodiment of signaling the set of channel access parameters to use, a channel access parameter identifier may be transmitted from the gNB to the UE. The channel access parameter identifier may be used to determine the LGBT category and the optional CP extension, Priority Group, and/or the ED threshold.

In the description that follows a table will be used to determine the set of channel access parameters to use in describing the inventive concepts. It should be understood that other structures may be used structure the channel access parameters.

In one embodiment, a table is not only used for signaling LBT parameters for PUSCH transmission via DCI, but also used for signaling LBT parameters for Msg3 via RAR. A second table is created for Msg3 according to the basic table. The second table comprises only part of the table entries of the basic table. For example, as shown in Table 3, the second table may be created by removing entries containing Cat2_16us.

TABLE 3

An example of the second table

| Row index | LBT category | CP extension | Channel access priority class |
|---|---|---|---|
| 1 | none | 0 | 0 |
| 2 | none | 0 | 1 |
| 3 | none | 0 | 2 |
| 4 | none | 0 | 3 |
| 5 | Cat2_25 us | 0 | 0 |
| 6 | Cat2_25 us | 0 | 1 |
| 7 | Cat2_25 us | 0 | 2 |
| 8 | Cat2_25 us | 0 | 3 |
| 9 | Cat2_25 us | 1 | 0 |
| 10 | Cat2_25 us | 1 | 1 |
| 11 | Cat2_25 us | 1 | 2 |
| 12 | Cat2_25 us | 1 | 3 |
| 13 | CAT 4 | 0 | — |

In another embodiment, the table entries mapping to different channel access priority class values for non LBT operation may be condensed so that there is only one table entry mapping to non LBT operation for a UE, when the Msg3 initiated by the UE does not transmit UP data and the RRC signaling message.

In a further embodiment, the table entries mapping to Cat2_25us and with CP extension may be removed in the second table for a UE that is expected not to perform CP extension for Msg3.

A UE may, upon reception of a channel access parameter identifier, determine which mapping table to apply for this channel access parameter identifier. If the channel access parameter identifier is received in a first message, e.g. DCI carrying a dynamic transmission grant, the UE would determine the channel access parameters by applying the first mapping in the first table. Similarly, if the UE receives the indication in a second message, e.g. a Random Access Response, RAR, the UE would determine the channel access parameters by applying the second mapping in the second table.

In another embodiment, no extra table is created for signaling LBT parameters for Msg3. In other words, there is only one table maintained for both PUSCH transmission and Msg3 in the RA procedure. However, a specific rule may be defined for UEs to do remapping to find a table entry in the table.

For example, the RAR message may use 2 bits to carry a shortened table index n. The UE can calculate a new index equal to the number of LBT categories*n+m, where n may be the value of the channel access parameter identifier and m is an offset determined by the UE. The new index is mapped to an entry in the table (e.g., table 2). In this example, the remapping/redetermination of the new index is based on a fact that the UE has initiated a RA for a service/traffic with a priority class m (e.g., in the range 0-3, as shown in the table when the number of LBT categories is 4). In other embodiments, the range may be 1-4 when the number of LBT categories is 4. The Msg3 carries not only RRC message, but also some service data. After searching the table with the new index, the UE can find the appropriate LBT category for Msg3, and initiates transmission of Msg3 accordingly.

In another embodiment, the gNB may configure a subset of table entries from the table for signaling LBT parameters for Msg3 for a UE. The configuration may be signaled to the UE via e.g., a RRC signaling. The gNB can then use fewer bits in the RAR to carry/signal the index of the selected subset of table entries.

In these embodiments where there is a single table, A UE may, upon reception of channel access parameter identifier, determine a table index which this identifier corresponds to. When the identifier is received in a first message, e.g. DCI carrying a dynamic transmission grant, the UE would determine a table index by applying a first formula (e.g. table index=signaled value where the signaled value is a value of the channel access parameter identifier). When the UE receives the identifier in a second message, e.g. a Random Access Response, the UE can determine a table index by applying a second formula (e.g. table index=the number of LBT categories*signaled value+m). When the UE has determined the table index, the UE can apply the corresponding channel access parameters based on the entry with the determined index.

A gNB may, when the gNB indicates the channel access parameters to use to the UE, determine an index for a table with channel access parameters. When the identifier is to be sent in a first message, e.g. DCI carrying a dynamic transmission grant, the gNB may determine an index by applying a first formula (e.g. table index=signaled value). When the identifier is to be sent in a second message, e.g. a Random Access Response, the gNB may determine an index by applying a second formula (e.g. table index=number of LBT categories*signaled value+m). When the gNB has determined the index, the gNB may signal this value to the UE in the corresponding message, i.e. if the index has been determined to be sent in a first message type, the gNB would send index in the first message based on the first formula.

Operations of the wireless device 800 (implemented using the structure of the block diagram of FIG. 8) will now be discussed with reference to the flow chart of FIG. 10 according to some embodiments of inventive concepts. For example, modules may be stored in memory 805 of FIG. 8, and these modules may provide instructions so that when the instructions of a module are executed by respective wireless device processing circuitry 803, processing circuitry 803 performs respective operations of the flow chart.

Figure 10:
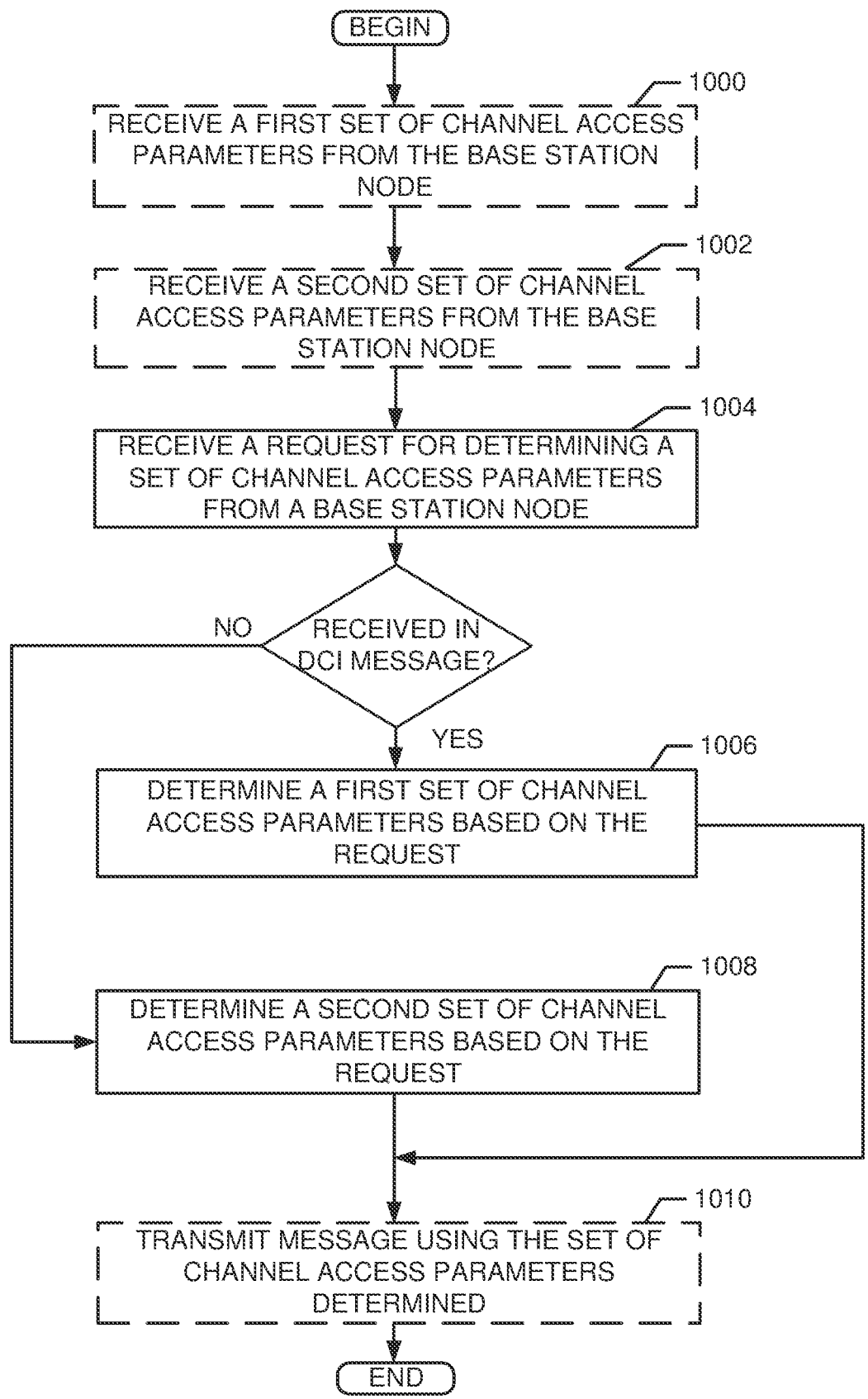
FIG. 10 is a flow chart illustrating operations of a UE according to some embodiments of inventive concepts.

Turning now to FIG. 10, in operation 1000, the processing circuitry 803 may, via transceiver 801, receive a first set of channel access parameters from the base station node 900. In other embodiments, the UE may already have the first set of channel access parameters such as when the first set of channel access parameters are specified in a standard.

In operation 1002, the processing circuitry 803 may, via transceiver 801, receive a second set of channel access parameters from the base station node 900. In other embodiments, the UE may already have the second set of channel access parameters such as when the second set of channel access parameters are specified in a standard. The second set of channel access parameters may be a subset of the first set of channel access parameters.

In operation 1004, the processing circuitry 803 may, via transceiver 801, receive a request for determining a set of channel access parameters from the base station node 900. The request may include a channel access parameter identifier. The channel access parameter identifier may be used to identify channel access parameters the UE may use in transmitting signals to the base station node 900.

In operation 1006, responsive to receiving the request in a downlink control information (DCI) message, the processing circuitry 803 may determine a first set of channel access parameters based on the request. The determining of the first set of channel access parameters may be based on the channel access parameter identifier.

In one embodiment, a common table of channel access parameters is used and is stored in the UE. The channel access parameter identifier in this embodiment is indicative of an entry point into the common table.

The first set of parameters may include a plurality of first channel access parameter identifiers and for each one of the plurality of first channel access parameter identifiers: a listen before talk, LBT, category preceding transmission of the channel access parameter identifier. In some embodiments, the first set of parameters may further include for each of the plurality of first channel access parameter identifiers: at least one of a cyclic prefix, CP, extension indicator indicating whether the UE is expected to perform CP extension, a priority group, and/or an energy detection, ED, threshold. The priority group may be linked to one or more of a specific one or set of LBT priority class, a specific one or set of logical channels, and/or a specific one or set of quality of service class identifier, QCI, values.

In one embodiment, the first set of channel access parameters is structured as a plurality of rows, each row of the plurality of rows including one of the plurality of first channel access parameters identifiers, the LBT category associated with the one of the plurality of first channel access parameter identifiers, the priority group, the CP extension indicator, and the ED threshold. For example, the first set of channel access parameters may be in the form of a table such as table 2 described above.

In operation 1008, responsive to receiving the request in a random access response (RAR) message, the processing circuitry 803 may determine a second set of channel access parameters based on the request. The second set of parameters may be a subset of the first set of parameters. The second set of parameters may include a plurality of second channel access parameter identifiers and for each one of the plurality of second channel access parameter identifiers; a listen before talk, LBT, category for subsequent transmissions by the UE.

In some embodiments, the second set of parameters may further include for each of the plurality of first channel access parameter identifiers: at least one of a cyclic prefix, CP, extension indicator indicating whether the UE is expected to perform CP extension, a priority group, and/or an energy detection, ED, threshold. The priority group may be linked to one or more of a specific one or set of LBT priority class, a specific one or set of logical channels, and/or a specific one or set of quality of service class identifier, QCI, values.

In one embodiment, the second set of channel access parameters is structured as a plurality of rows, each row of the plurality of rows including one of the plurality of second channel access parameters identifiers, the LBT category associated with the one of the plurality of first channel access parameter identifiers, the priority group, the CP extension indicator, and the ED threshold. For example, the second set of channel access parameters may be in the form of a table such as table 3 described above.

In some embodiments, when the second set of parameters is a subset of the first set of parameters such as when there is common table used as described above, determining the first set of channel access parameters comprises determining an index in the first set of channel access parameters by applying a first formula and determining the second set of channel access parameters comprises determining an index in the second set of channel access parameters by applying a second formula.

The first formula may be index=signaled value, where the signaled value may be a value of the channel access parameter identifier. In other words, the channel access parameter identifier may be an index entry into the first set of channel access parameters.

The second formula may be index=number of priority classes*signaled value+m, where the signaled value may be a value of the channel access parameter identifier, the number of priority classes may be associated with a number of LBT categories, and in may be an offset value determined by the UE. For example when the number of LBT categories is 4, then the index may be derived using index=4*signaled value+m. The parameter m is an offset that is based on the number of LBT categories. For example, when the number of LBT categories is 4, m may be a value between 0 and 3. In other embodiments, m may be a value between 1 and 4.

In operation 1010, the processing circuitry 803 may, via transceiver 801, transmit a subsequent message to the base station node 900 based on the first channel access parameters corresponding to the index. In other embodiments, the processing circuitry 803 may, via transceiver 801, perform a transmission to the base stations node based on the first channel access parameters or the second channel access parameters determined by the processing circuitry 803.

Various operations from the flow chart of FIG. 10 may be optional with respect to some embodiments of wireless devices and related methods. Regarding methods of example embodiment 1 (set forth below), for example, operations of blocks 1000, 1002, and 1010 of FIG. 10 may be optional.

Figure 1:
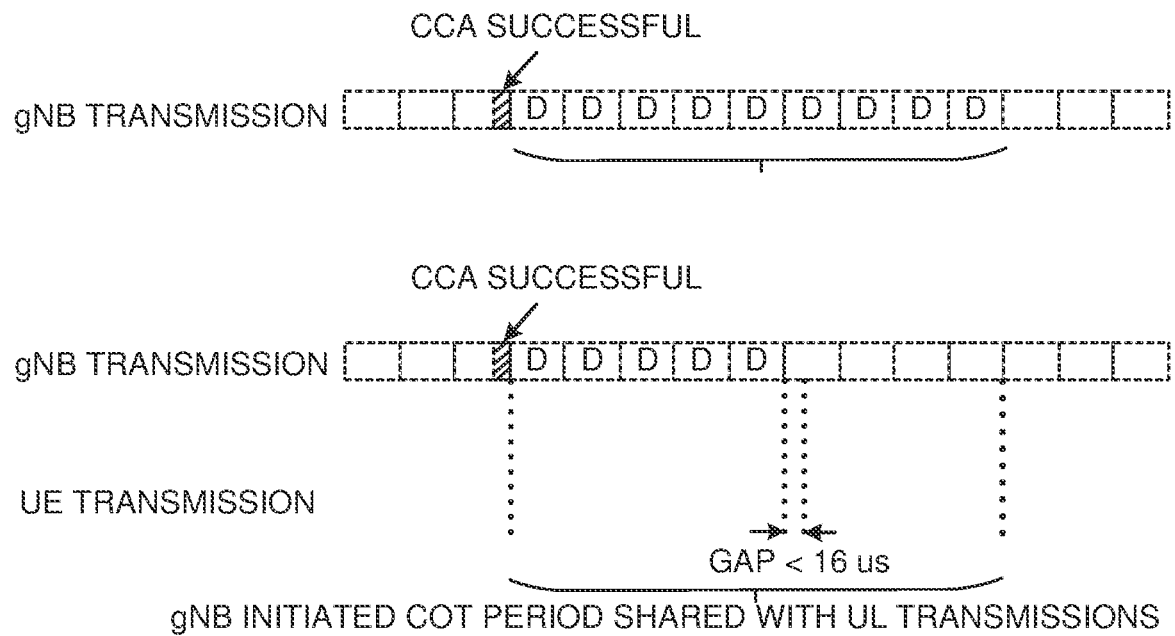
FIG. 1 is an illustration of transmission opportunities (TXOP) both with and without COT sharing where CCA is performed by the initiating node (gNB). For the case of COT sharing the gap between DL and UL transmission is less than 16 us.
Figure 2:
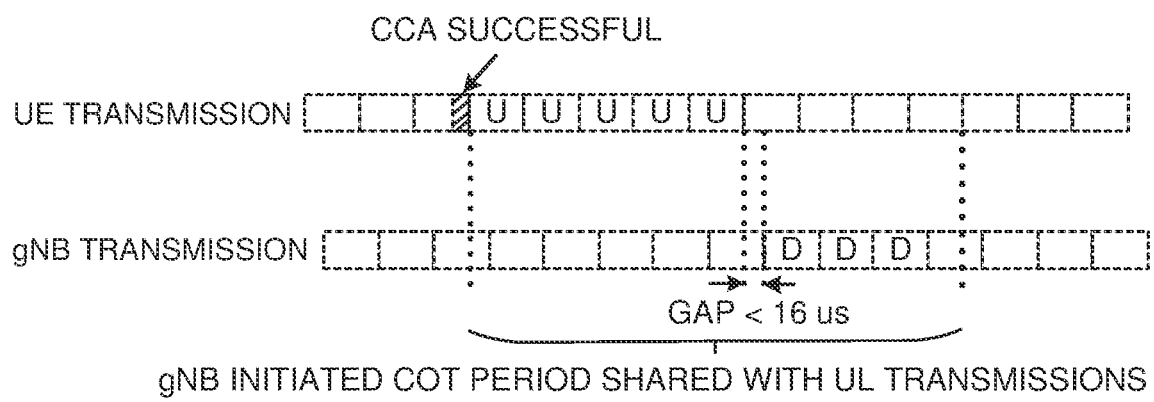
FIG. 2 is an illustration of UE COT sharing with the DL transmission.
Figure 3:
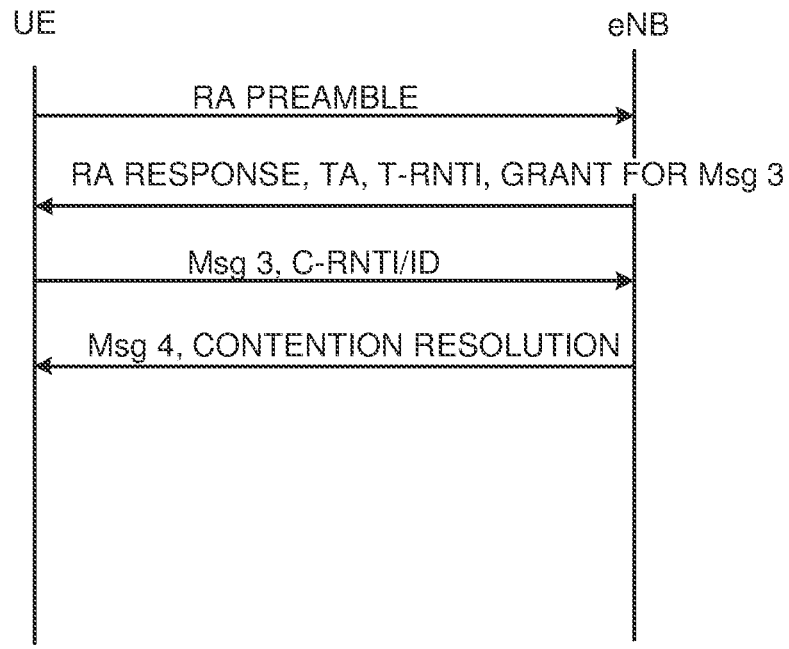
FIG. 3 is a signal diagram illustrating 4-step RA.
Figure 4:
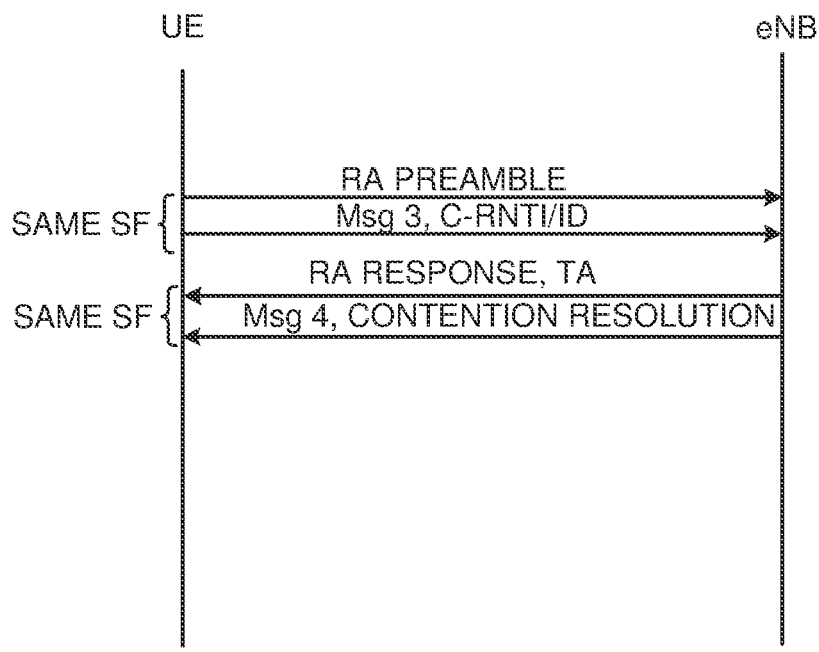
FIG. 4 is a signal diagram illustrating 2-step RA.
Figure 5:
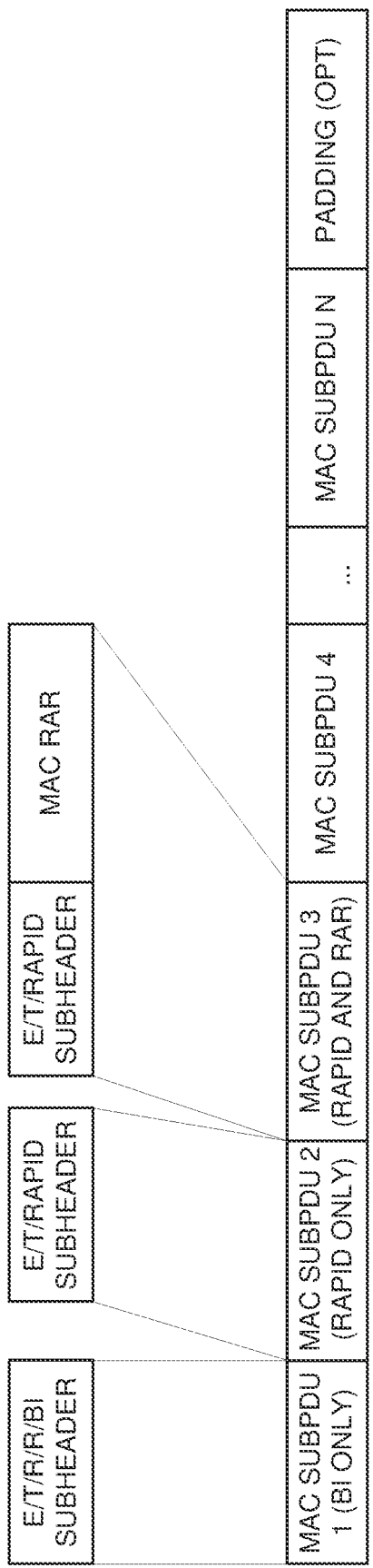
FIG. 5 illustrates an example of MAC PDU consisting of MAC RARs.
Figure 6:
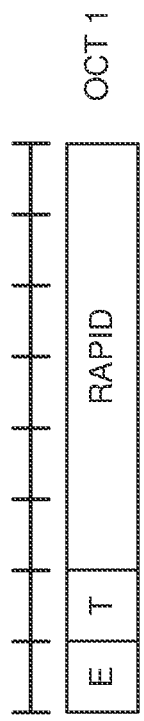
FIG. 6 is an illustration of an E/T/RAPID MAC subheader.

Operations of a RAN node 400 (implemented using the structure of FIG. 4) will now be discussed with reference to the flow chart of FIG. 11 according to some embodiments of inventive concepts. For example, modules may be stored in memory 905 of FIG. 4, and these modules may provide instructions so that when the instructions of a module are executed by respective RAN node processing circuitry 903, processing circuitry 903 performs respective operations of the flow chart.

Figure 11:
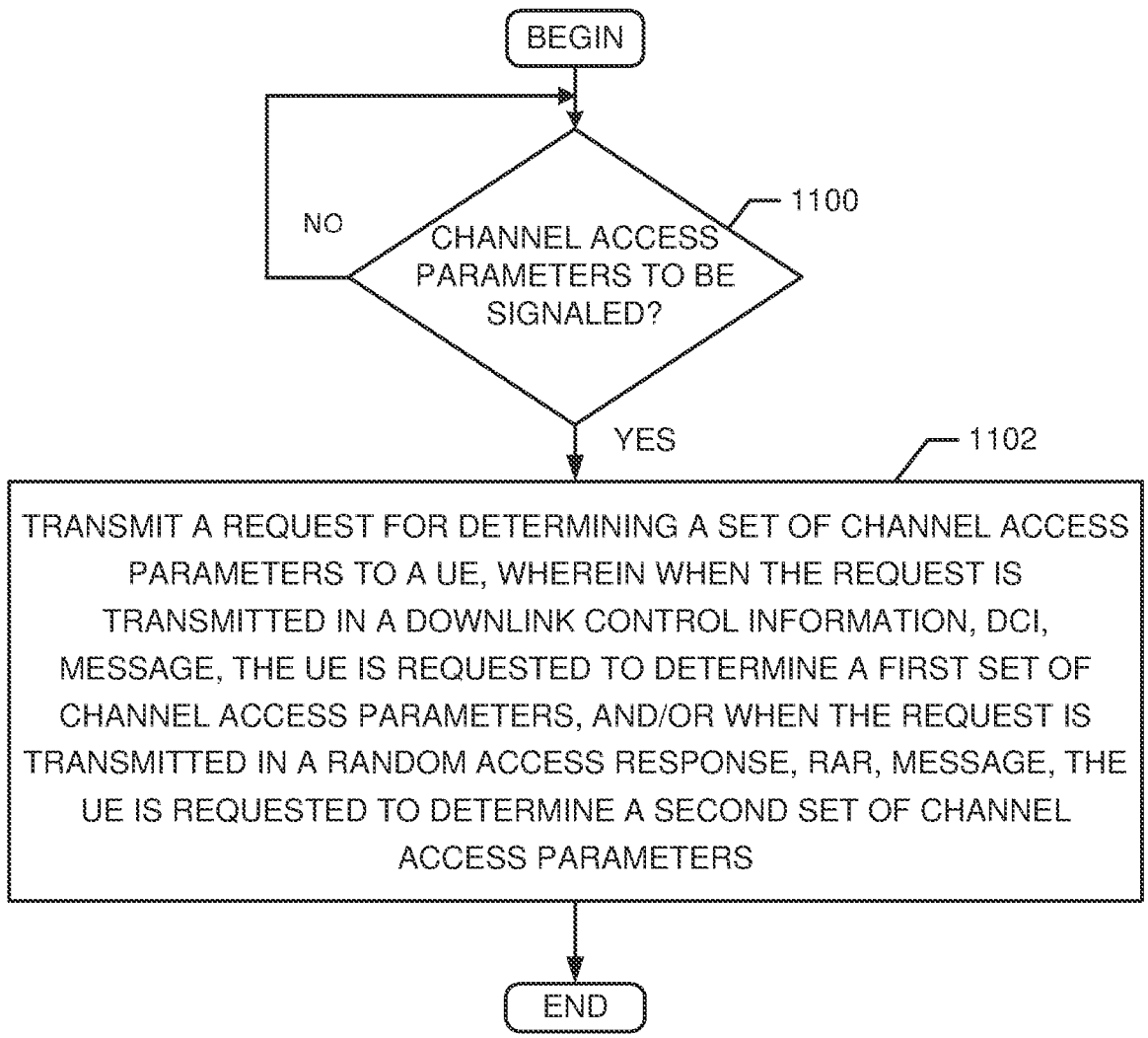
FIGS. 11-12 are flow charts illustrating operations of a RAN node according to some embodiments of inventive concepts.

Turning now to FIG. 11, in operation 1100, the processing circuitry 903 may determine whether channel access parameters are to be signaled to a user equipment (UE).

In operation 1102, the processing circuitry 903 may transmit a request for determining a set of channel access parameters to a UE, wherein when the request is transmitted in a downlink control information, DCI, message, the UE is requested to determine a first set of channel access parameters, and/or when the request is transmitted in a random access response, RAR, message, the UE is requested to determine a second set of channel access parameters. The second set of channel access parameters may be a subset of the first set of channel access parameters.

The request may be a channel access parameter identifier. Selecting the first set of parameters and/or the second set of parameters may be based on the channel access parameter identifier. The channel access parameter identifier may be indicative of an entry point into a common table of channel access parameters, such as when only one table structure is used for the first set of channel access parameters and the second set of channel access parameters.

In an embodiment, when the second set of parameters is a subset of the first set of parameters, the channel access parameter into the common table may point to a first parameter of the second set (wherein the first parameter of the first set may be the first parameter of the common table or any predefined parameter). Alternatively, there may be two entry points into the table each for the first subset and the second subset, and each entry point may be signalled by a n own channel access parameter identifier.

When multiple tables are used, the channel access parameter identifier may be indicative of one of at least two different tables of channel access parameters to be applied by the UE.

Figure 12:
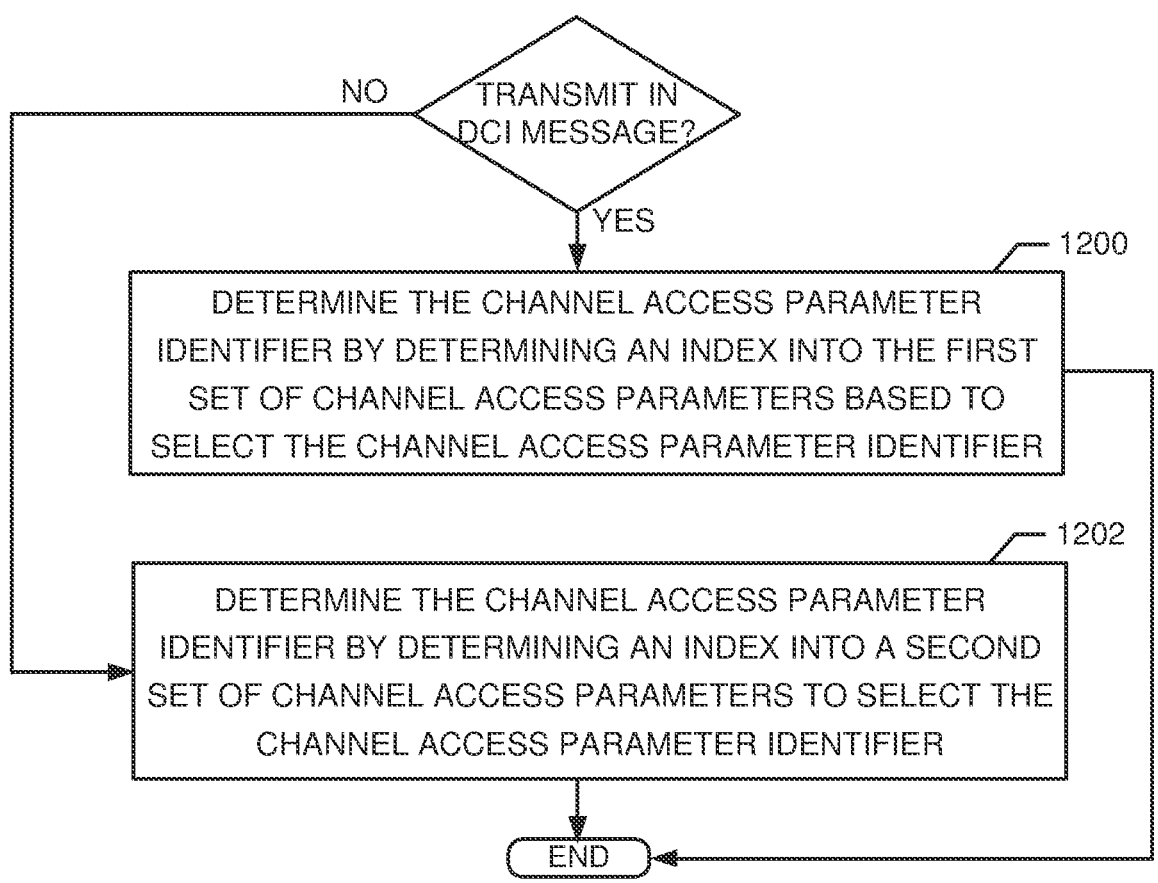

Selecting the channel access parameter identifier for the request may be based on when the request is being sent to the UE. Turning to FIG. 12, in operation 1200, the processing circuitry 903 may, responsive to determining the channel access parameter identifier is to be sent in a DCI message, determine channel access parameter identifier by determining an index into the first set of channel access parameters to select the channel access parameter identifier.

In operation 1202, the processing circuitry 903 may, responsive to determining the channel access parameter identifier is to be sent in a RAR message, determine channel access parameter identifier by determining an index into the second set of channel access parameters to select the channel access parameter identifier.

In some embodiments, when the second set of parameters is a subset of the first set of parameters such as when there is only one table used as described above (also being referred to as common table), determining the index into the first set of channel access parameters (also being referred to as first entry point into the common table) may include applying a first formula to determine the index in the first set of channel access parameters and determining the index in the second set of channel access parameters may include applying a second formula to determine the index in the second set of channel access parameters (also being referred to as second entry point into the common table).

The first formula may be index=signaled value, where the value of the channel access parameter identifier comprises the signaled value.

The second formula may be index=number of priority classes*signaled value+m, where a value of the channel access parameter identifier may comprise the signaled value, the number of priority classes may be associated with a number of LBT categories, and m comprises an offset value determined by the UE. For example when the number of LBT categories is 4, then the second formula becomes index=4*signaled value+m. The parameter m is an offset that is based on the number of LBT categories. For example, when the number of LBT categories is 4, m may be a value between 0 and 3. In other embodiments, m may be a value between 1 and 4.

The processing circuitry 903, via transceiver 901 and/or network interface 907, may transmit the first set of channel access parameters to the UE. When the second set of parameters is a subset of the first set of parameters such that, for example, two tables are used as described above, the processing circuitry 903, via transceiver 901 and/or network interface 907, transmit the second set of channel access parameters to the UE. In other embodiments, the UE may already have the first set of channel access parameters and the second set of access parameters when the first set of channel access parameters and the second set of access parameters have been standardized.

Example embodiments are discussed below.

Embodiment 1. A method of operating a user equipment, UE, (800) in a communication network, the method comprising:
 receiving (1004) a request for determining a set of channel access parameters from a base station node;
 responsive to receiving the request in a downlink control information, DCI, message, determining (1006) a first set of channel access parameters based on the request;
 responsive to receiving the request in a random access response, RAR, message, determining (1008) a second set of channel access parameters based on the request.

Embodiment 2. The method of Embodiment 1 wherein the second set of channel access parameters comprises a subset of the first set of channel access parameters.

Embodiment 3. The method of any of Embodiments 1-2 wherein the wherein the request comprises a channel access parameter identifier, and wherein determining of the first set of channel access parameters and/or the second set of channel access parameters is based on the channel access parameter identifier.

Embodiment 4. The method of the Embodiment 3, wherein the UE comprises a common table of channel access parameters and wherein the channel access parameter identifier is indicative of an entry point into the common table.

Embodiment 5. The method of Embodiment 3, wherein the UE comprises a first table of channel access parameters and a second table of channel access parameters and wherein the channel access parameter identifier is indicative of the table to be applied by the UE.

Embodiment 6. The method of any of Embodiments 1-5 wherein the first set of channel access parameters comprises a plurality of first channel access parameter identifiers and for each one of the plurality of first channel access parameter identifiers: a listen before talk, LBT, category for subsequent transmissions by the UE.

Embodiment 7. The method of Embodiment 6 wherein the LBT category comprises one of category 4 sensing, category 2 sensing, and category 1 immediate transmission.

Embodiment 8. The method of any of Embodiments 6-7 wherein the first set of channel access parameters further comprises for each of the plurality of first channel access parameter identifiers: at least one of a cyclic prefix, CP, extension indicator indicating whether the UE is expected to perform CP extension, a priority group, and an energy detection, ED, threshold.

Embodiment 9. The method of Embodiment 8 wherein the priority group is linked to one or more of a specific one or set of LBT priority class, a specific one or set of logical channels, and a specific one or set of quality of service class identifier, QCI, values.

Embodiment 10. The method of Embodiment 9 wherein the first set of channel access parameters is structured as a plurality of rows, each row of the plurality of rows including one of the plurality of first channel access parameters identifiers, the LBT category associated with the one of the plurality of first channel access parameter identifiers, the priority group, the CP extension indicator, and the ED threshold.

Embodiment 11. The method of any of Embodiments 1-10 wherein the second set of channel access parameters comprises a plurality of second channel access parameter identifiers and for each of the plurality of second channel access parameter identifiers: a listen before talk, LBT, category for subsequent transmissions by the UE.

Embodiment 12. The method of Embodiment 11 wherein the second set of channel access parameters further comprises for each one of the plurality of second channel access parameters: at least one of a cyclic prefix, CP, extension indicator indicating whether the UE is expected to perform CP extension, a priority group, and an energy detection, ED, threshold.

Embodiment 13. The method of Embodiment 12 wherein the priority group is linked to one or more of a specific one or set of LBT priority class, a specific one or set of logical channels, and a specific one or set of quality of service class identifier, QCI, values.

Embodiment 14. The method of Embodiment 12 wherein the second set of channel access parameters are structured as a plurality of rows, each row of the plurality of rows including one of the plurality of second channel access parameters identifiers, the LBT category associated with the one of the plurality of second channel access parameter identifiers, the priority group, the CP, and the ED threshold.

Embodiment 15. The method of any of Embodiments 1-14 further comprising receiving (1000) the first set of channel access parameters from the base station node.

Embodiment 16. The method of any of Embodiments 1-14 further comprising receiving (1002) the second set of channel access parameters from the base station node.

Embodiment 17. The method of any of Embodiments 1-16 wherein determining the first set of channel access parameters comprises determining an index into the first table of channel access parameters by applying a first formula, and determining the second set of channel access parameters comprises determining an index into the second table of channel access parameters by applying a second formula.

Embodiment 18. The method of Embodiment 17 wherein the first formula comprises:

$$index = signaled\ value,$$

where the signaled value comprises a value of the channel access parameter identifier.

Embodiment 19. The method of any of Embodiments 1-18 further comprising performing a transmission to the base station node based on the first channel access parameters.

Embodiment 20. The method of Embodiment 17, wherein the second formula comprises:

$$index = number\ of\ priority\ classes * signaled\ value + m,$$

where the signaled value comprises a value of the channel access parameter identifier, the number of priority classes associated with a number of LBT categories, and m comprises an offset value determined by the UE.

Embodiment 21. The method of Embodiment 20 wherein the number of priority classes is 4.

Embodiment 22. The method of any of Embodiments 20-21 further comprising transmitting (1010) a subsequent message to the base station node based on the set of channel access parameters determined corresponding to the index.

Embodiment 23. A wireless device (800) configured to operate in a communication network, the wireless device comprising:
processing circuitry (803); and
memory (805) coupled with the processing circuitry (803), wherein the memory (805) includes instructions that when executed by the processing circuitry (803) causes the wireless device (800) to perform operations according to any of Embodiments 1-22.

Embodiment 24. A wireless device (800) configured to operate in a communication network, wherein the wireless device is adapted to perform operations according to any of Embodiments 1-22.

Embodiment 25. A computer program comprising program code to be executed by processing circuitry (803) of a wireless device (800) configured to operate in a communication network, whereby execution of the program code causes the wireless device (800) to perform operations according to any of Embodiments 1-22.

Embodiment 26. A computer program product comprising a non-transitory storage medium including program code to be executed by processing circuitry (803) of a wireless device (800) configured to operate in a communication network, whereby execution of the program code causes the wireless device (800) to perform operations according to any of Embodiments 1-22.

Embodiment 27. A method of operating a radio access network node, RAN, (900) in a communication network, the method comprising:
transmitting (1102) a request for determining a set of channel access parameters to a user equipment, UE;
wherein when the request is transmitted in a downlink control information, DCI, message, the UE is requested to determine a first set of channel access parameters, and/or when the request is transmitted in a random access response, RAR, message, the UE is requested to determine a second set of channel access parameters.

Embodiment 28. The method of Embodiment 27 wherein the second set of channel access parameters comprises a subset of the first set of channel access parameters.

Embodiment 29. The method of any of Embodiments 27-28 further comprising determining (1100) whether channel access parameters are to be signaled to the UE Embodiment 30. The method of any of Embodiments 27-29, wherein the request comprises a channel access parameter identifier, and wherein the selecting of the first set of parameters and/or the second set of parameters is based on the channel access parameter identifier.

Embodiment 31. The method of Embodiment 30, wherein the channel access parameter identifier is indicative of an entry point into a common table of channel access parameters.

Embodiment 32. The method of Embodiment 30, wherein the channel access parameter identifier is indicative of one of at least two different tables of channel access parameters to be applied by the UE.

Embodiment 33. The method of any of Embodiments 27-32, further comprising:
responsive to determining the channel access parameter identifier is to be sent in a DCI message, determining (1200) the channel access parameter identifier by determining an index into the first set of channel access parameters to select the channel access parameter identifier;
responsive to determining the channel access parameter identifier is to be sent in a RAR message, determining (1202) the channel access parameter identifier by determining an index in the second set of channel access parameters to select the channel access parameter identifier.

Embodiment 34. The method of Embodiment 33 wherein determining the index in the first set of channel access parameters comprises applying a first formula to determine the index in the first set of channel access parameters and determining the index in the second set of channel access parameters comprises applying a second formula to determine the index in the second set of channel access parameters.

Embodiment 35. The method of Embodiment 34 wherein the first formula comprises:

index=signaled value, where a value of the channel access parameter identifier comprises the signaled value.

Embodiment 36. The method of Embodiment 34, wherein the second formula comprises:

index=number of priority classes*signaled value+m, where a value of the channel access parameter identifier comprises the signaled value, the number of priority classes comprises a number of LBT categories, and m comprises an offset value determined by the UE.

Embodiment 37. The method of any of Embodiments 27-36, further comprising transmitting the second set of channel access parameters to the UE.

Embodiment 38. The method of any of Embodiments 27-37, further comprising transmitting the first set of channel access parameters to the UE.

Embodiment 39. A radio access network, RAN, node (900) configured to operate in a communication network, the RAN node (900) comprising:
processing circuitry (903); and
memory coupled with the processing circuitry (903), wherein the memory includes instructions that when executed by the processing circuitry (903) causes the RAN node (900) to perform operations according to any of Embodiments 27-38.

Embodiment 40. A radio access network, RAN, node (900) configured to operate in a communication network, wherein the RAN node (900) is adapted to perform according to any of Embodiments 27-38.

Embodiment 41. A computer program comprising program code to be executed by processing circuitry (903) of a radio access network, RAN, node (900) configured to operate in a communication network, whereby execution of the program code causes the RAN node (900) to perform operations according to any of Embodiments 27-38.

Embodiment 42. A computer program product comprising a non-transitory storage medium including program code to be executed by processing circuitry (903) of a radio access network, RAN, node (900) configured to operate in a communication network, whereby execution of the program code causes the RAN node (900) to perform operations according to any of Embodiments 27-38.

Explanations are provided below for various abbreviations/acronyms used in the present disclosure.

| Abbreviation | Explanation |
| --- | --- |
| 3GPP | 3rd Generation Partnership Project |
| 5G | 5th Generation |
| ACK/NACK | Acknowledgment/Not-acknowledgment |
| BWP | Bandwidth Part |
| CAT | Category |
| CCA | Channel Clear Assessment |
| COT | Channel occupancy time |
| CP | Cyclic Prefix |
| CSI | Channel State Information |
| DCI | Downlink Control Information |
| DFTS-OFDM | Discrete Fourier Transform Spread OFDM |
| DL | Downlink |
| DM-RS | Demodulation Reference Signal |
| ED | Energy Detection |
| eLAA | Enhanced LAA |
| eMBB | Enhanced Make Before Break |
| feLAA | Further Enhanced LAA |
| gNB | A radio base station in 5G/NR. |
| HARQ | Hybrid Automatic Repeat Request |
| ID | Identity/Identifier |
| LAA | License Assisted Access |
| LBT | Listen before talk |
| LTE | Long Term Evolution |
| MAC | Medium Access Control |
| MAC-CE | MAC Control Element |
| MtC | Machine Type Communication |
| NR | New Radio |
| OFDM | Orthogonal Frequency Division Multiplex |
| PBCH | Physical Broadcast Channel |
| PDCCH | Physical Downlink Control Channel |
| PDSCH | Physical Downlink Shared Channel |
| PRACH | Physical Random Access Channel |
| PRB | Physical Resource Block |
| PRS | Paging Reference Symbol |
| PUCCH | Physical Uplink Control Channel |
| PUSCH | Physical Uplink Shared Channel |
| RAR | Random Access Response |
| RB | Resource Block |
| RRC | Radio Resource Control |
| RV | Redundancy Version |
| SCS | Subcarrier Spacing |
| SLIV | Start and Length Indicator |
| tRS | Tracking reference symbol |
| TXOP/txOP | Transmission opportunity |
| UE | User Equipment |
| UL | Uplink |
| URLLC | Ultra-Reliable Low-Latency Communication |

REFERENCES ARE IDENTIFIED BELOW 1. 3GPP TR 38.889 v16.0.0, Technical Specification Group Radio Access Network, Study on NR-based access to unlicensed spectrum (Release 16)
2. 3GPP TS 38.321 v15.6.0, Technical Specification Group Radio Access Network, NR, Medium Access Control (MAC) protocol specification (Release 15)
3. 3GPP TS 38.213, v15.6.0, Specification Group Radio Access Network, NR, Physical layer procedures for control (Release 15)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
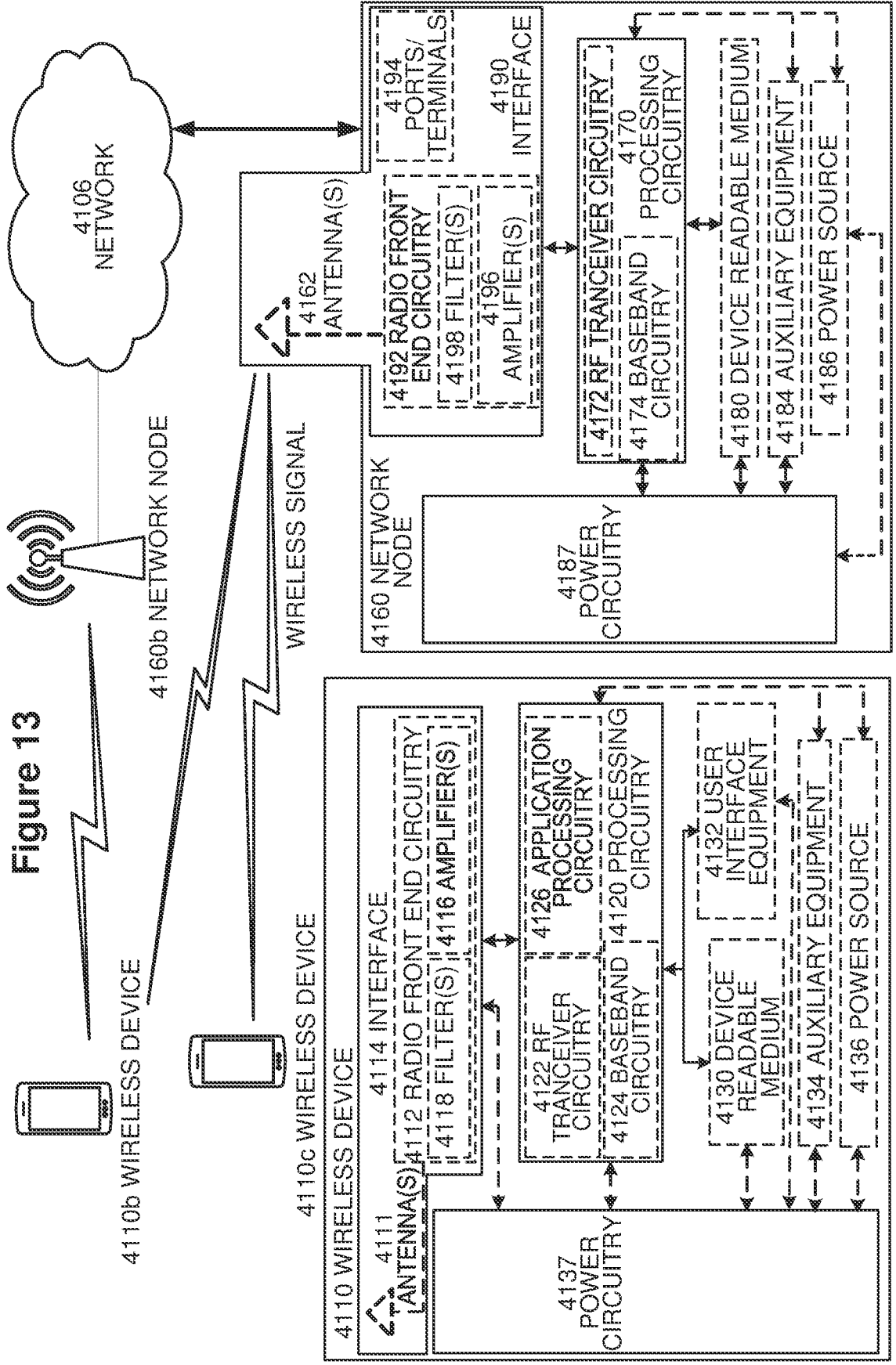
FIG. 13 is a block diagram of a wireless network in accordance with some embodiments.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pica base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 13 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 14:
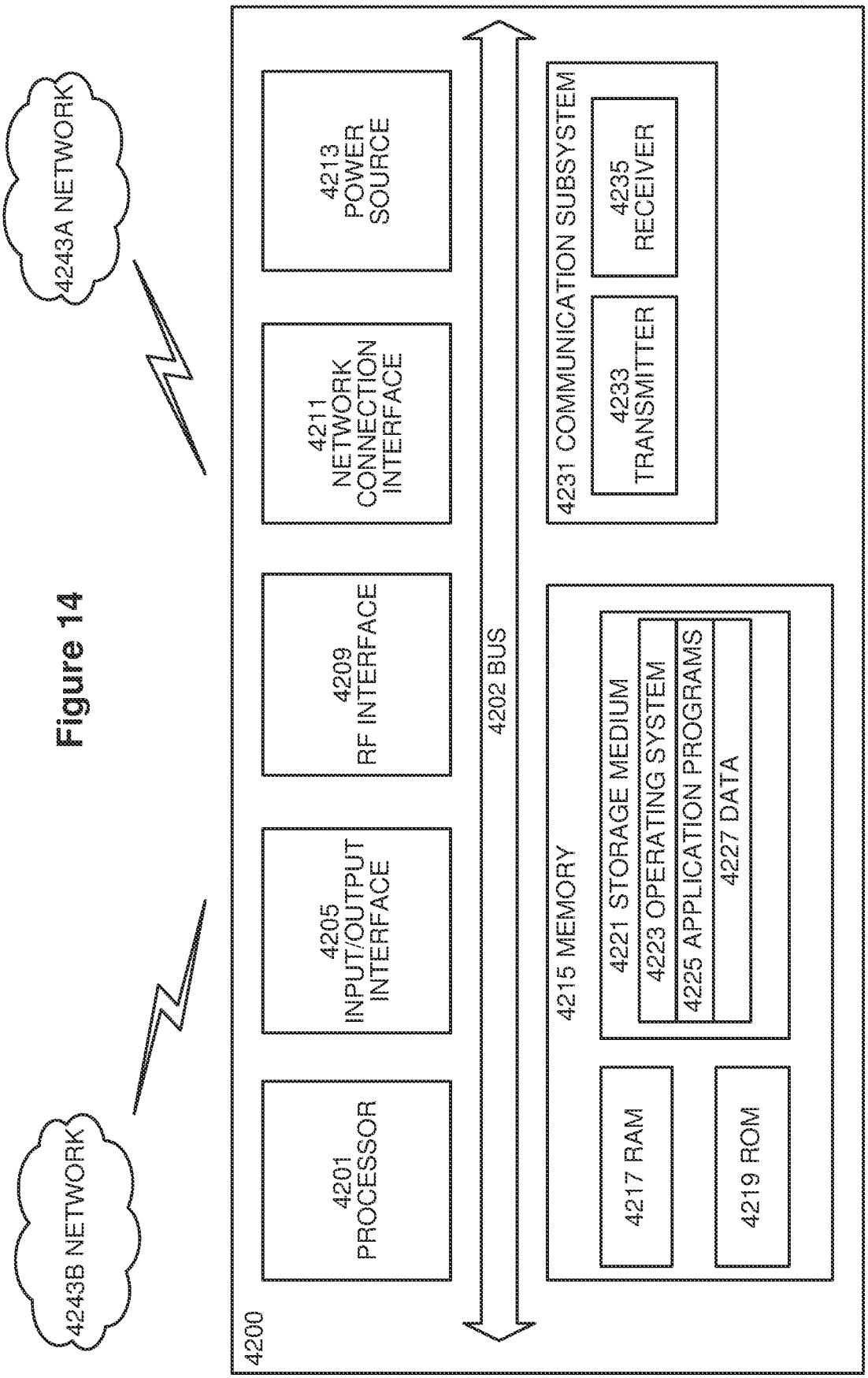
FIG. 14 is a block diagram of a user equipment in accordance with some embodiments.

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 14, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 15:
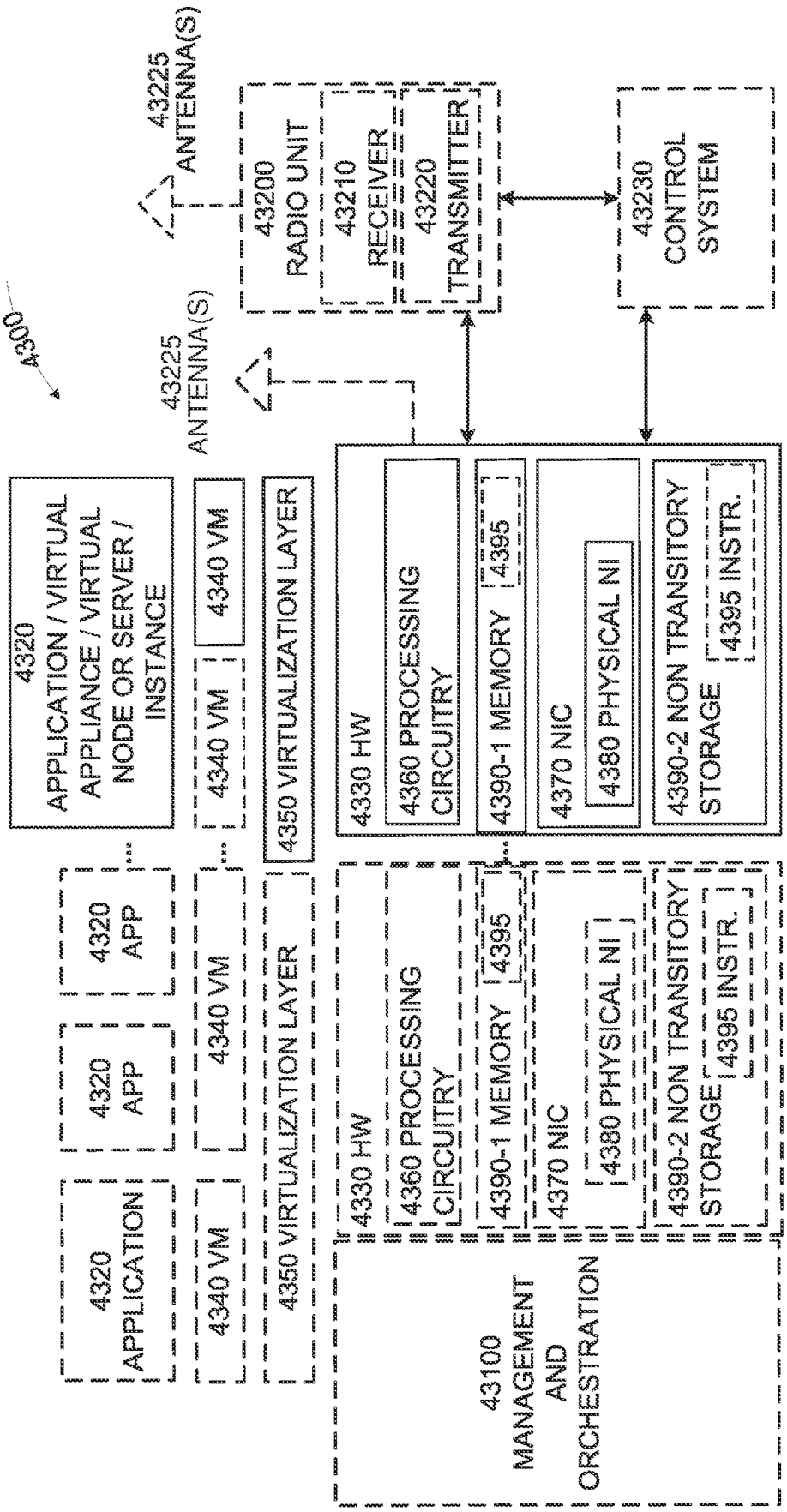
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 15, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 15.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 16:
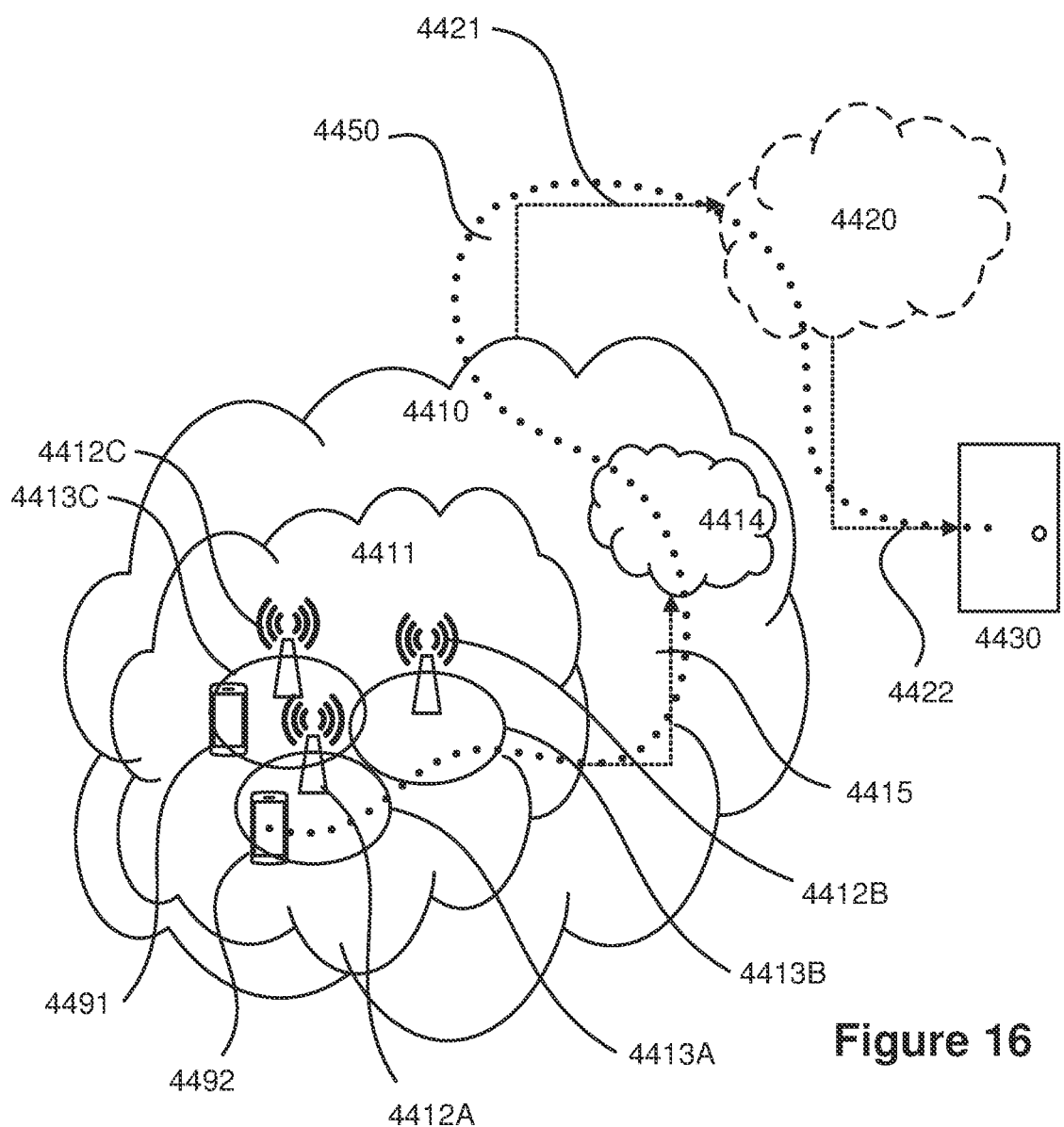
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 16 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 17:
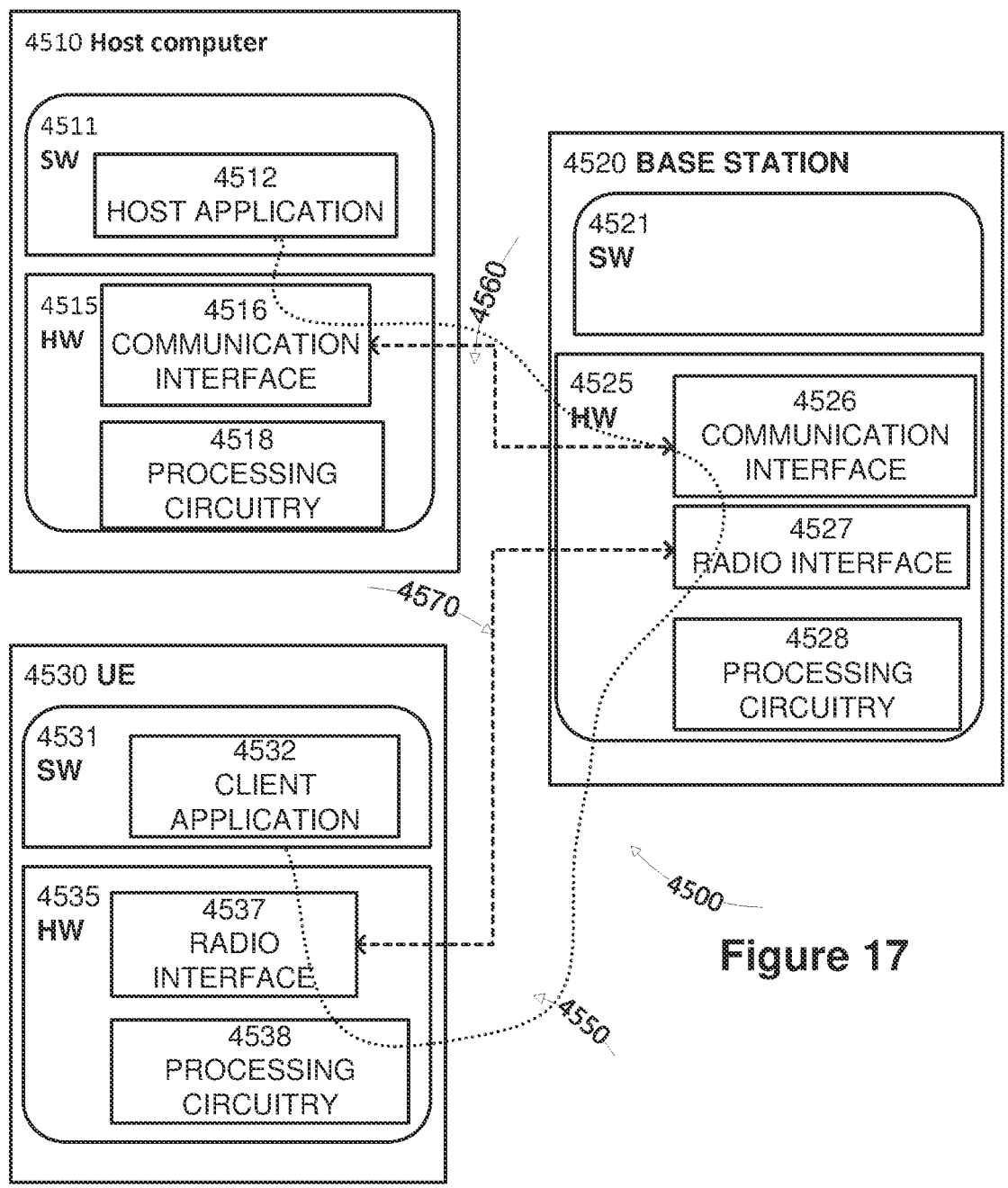
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 17) served by base station 4520. Communication interface 4526 may be configured to facilitate connection 4560 to host computer 4510. Connection 4560 may be direct or it may pass through a core network (not shown in FIG. 17) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 17 may be similar or identical to host computer 4430, one of base stations 4412a, 4412b, 4412c and one of UEs 4491, 4492 of FIG. 16, respectively. This is to say, the inner workings of these entities may be as shown in FIG. 17 and independently, the surrounding network topology may be that of FIG. 16.

In FIG. 17, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 18:
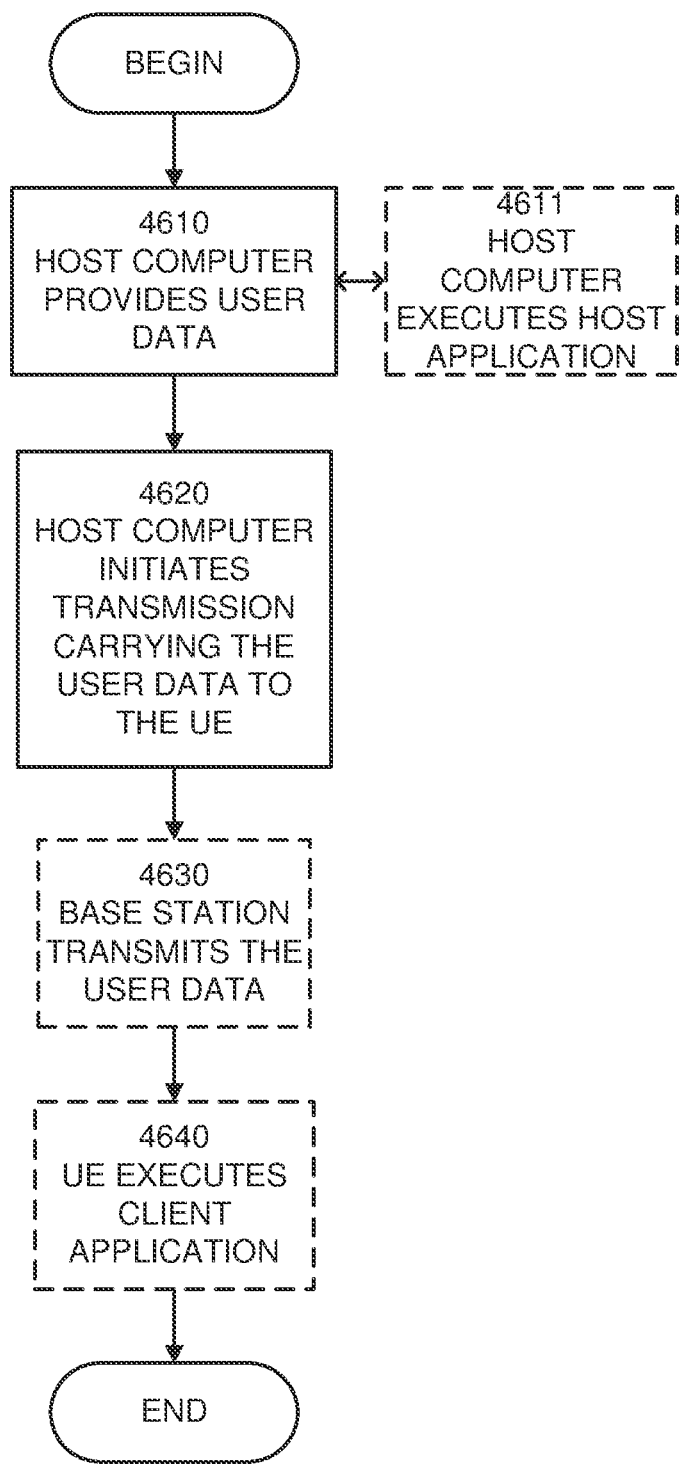
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 19:
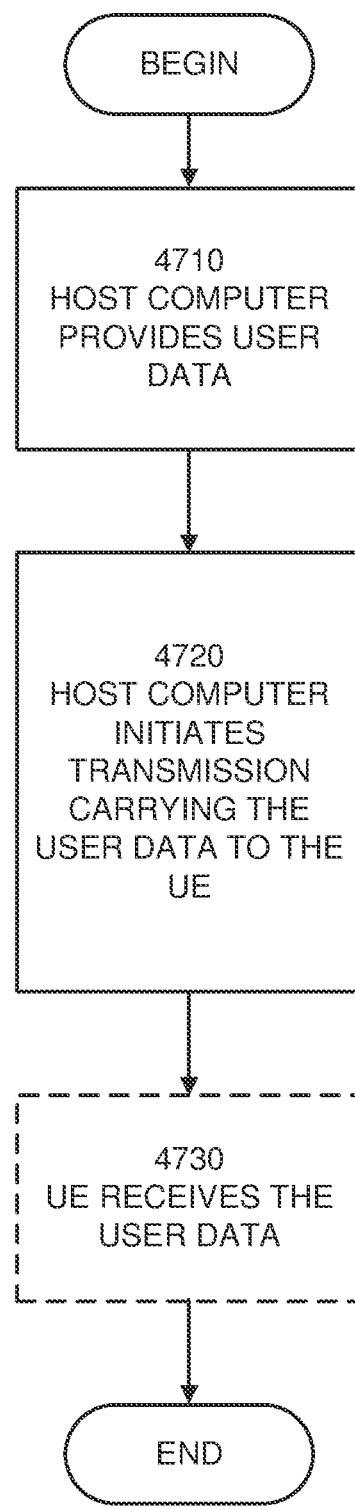
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 20:
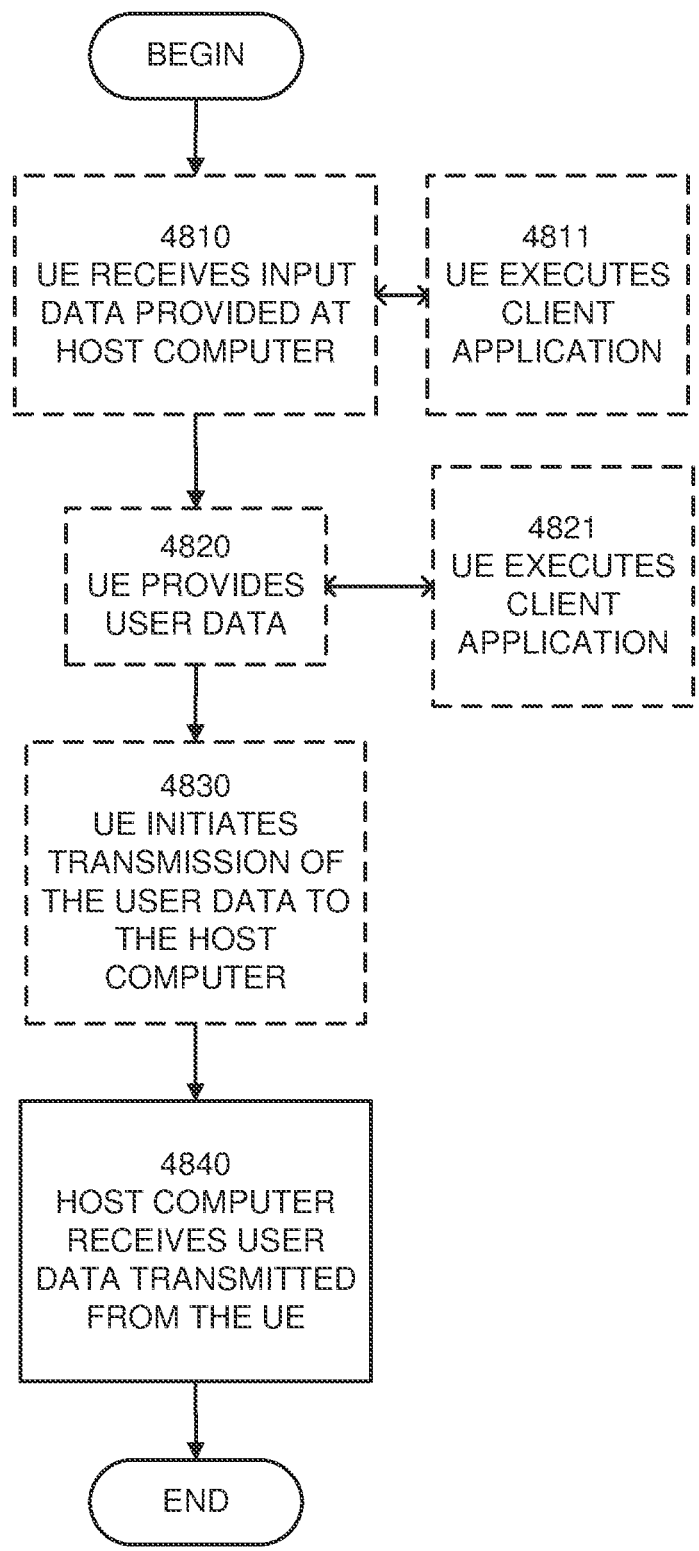
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 21:
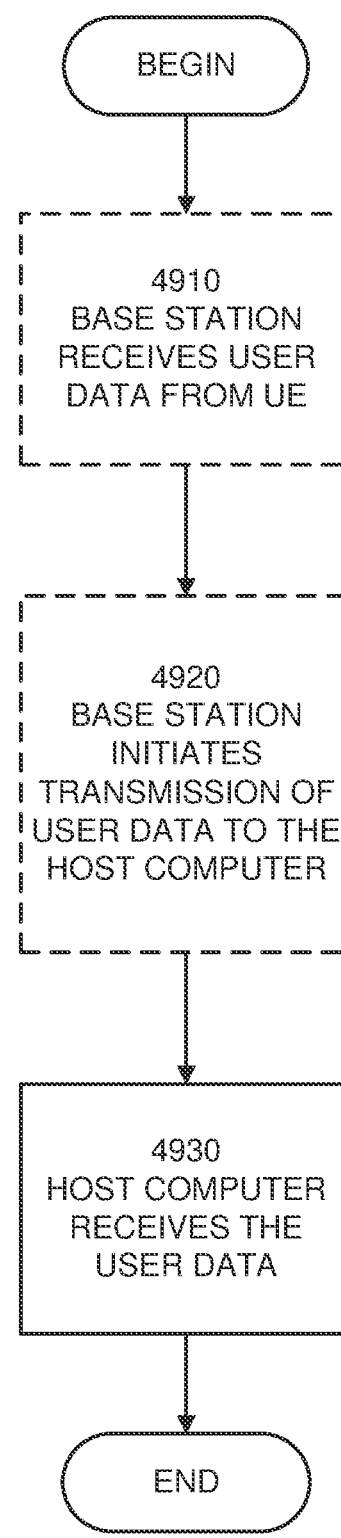
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM) random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a user equipment (UE) in a communication network, the method comprising:
   receiving a request comprising an indication for determining a set of channel access parameters from a base station node;
   responsive to receiving the indication in a downlink control information (DCI) message, determining a first set of channel access parameters based on the request; and
   responsive to receiving the indication in a random access response (RAR) message, determining a second set of channel access parameters based on the request, wherein the second set of channel access parameters is a subset of the first set of channel access parameters, wherein the indication indicates an entry point in a common table of channel access parameters, the entry point being different depending on whether the indication is received in the DCI message or in the RAR message.

2. The method of claim 1, wherein the indication comprises a channel access parameter identifier, and wherein determining the first set of channel access parameters and/or the second set of channel access parameters is based on the channel access parameter identifier.

3. The method of claim 2, wherein the UE comprises the common table of channel access parameters and wherein the channel access parameter identifier is indicative of an entry point into the common table of channel access parameters for the second set of channel access parameters.

4. The method of claim 1, wherein the first set of channel access parameters comprises a plurality of first channel access parameter identifiers and for each one of the plurality of first channel access parameter identifiers: a listen before talk (LBT) category for subsequent transmissions by the UE.

5. The method of claim 4 wherein the LBT category comprises one of category 4 sensing, category 2 sensing, and category 1 immediate transmission.

6. The method of claim 4, wherein the first set of channel access parameters further comprises for each of the plurality of first channel access parameter identifiers: at least one of a cyclic prefix (CP) extension indicator indicating whether the UE is expected to perform CP extension, a priority group, and an energy detection (ED) threshold.

7. The method of claim 6, wherein the priority group is linked to one or more of a specific one or set of LBT priority class, a specific one or set of logical channels, and a specific one or set of quality of service class identifier (QCI) values.

8. The method of claim 7, wherein the first set of channel access parameters is structured as a plurality of rows, each row of the plurality of rows including one of the plurality of first channel access parameters identifiers, the LBT category associated with the one of the plurality of first channel access parameter identifiers, the priority group, the CP extension indicator, and the ED threshold.

9. The method of claim 1, wherein the second set of channel access parameters comprises a plurality of second channel access parameter identifiers and for each of the plurality of second channel access parameter identifiers: a listen before talk (LBT) category for subsequent transmissions by the UE, and wherein the second set of channel access parameters further comprises for each one of the plurality of second channel access parameters identifiers: at least one of a cyclic prefix (CP) extension indicator indicating whether the UE is expected to perform CP extension, a priority group, and an energy detection (ED) threshold.

10. The method of claim 9, wherein the priority group is linked to one or more of a specific one or set of LBT priority class, a specific one or set of logical channels, and a specific one or set of quality of service class identifier (QCI) values.

11. The method of claim 9, wherein the second set of channel access parameters are structured as a plurality of rows, each row of the plurality of rows including one of the plurality of second channel access parameters identifiers, the LBT category associated with the one of the plurality of second channel access parameter identifiers, the priority group, the CP, and the ED threshold.

12. The method of claim 1, further comprising:
receiving the first set of channel access parameters from the base station node;
receiving the second set of channel access parameters from the base station node;
performing a transmission to the base station node based on the first set of channel access parameters; and
transmitting a subsequent message to the base station node based on a set of channel access parameters determined to be used based on the channel access parameter identifier.

13. A wireless device configured to operate in a communication network, the wireless device comprising:
processing circuitry; and
memory coupled with the processing circuitry, wherein the memory includes instructions that when executed by the processing circuitry causes the wireless device to perform operations comprising:
receiving a request comprising an indication for determining a set of channel access parameters from a base station node;
responsive to receiving the indication in a downlink control information (DCI) message, determining a first set of channel access parameters based on the request; and
responsive to receiving the indication in a random access response (RAR) message, determining a second set of channel access parameters based on the request, wherein the second set of channel access parameters comprises a subset of the first set of channel access parameters, wherein the indication indicates an entry point in a common table of channel access parameters, the entry point being different depending on whether the indication is received in the DCI message or in the RAR message.

14. The wireless device of claim 13, wherein the indication comprises a channel access parameter identifier, and wherein in determining the first set of channel access parameters and/or the second set of channel access parameters, and wherein the memory includes instructions that when executed by the processing circuitry causes the wireless device to perform operations comprising determining the first set of channel access parameters and/or the second set of channel access parameters based on the channel access parameter identifier.

15. The wireless device of claim 13, wherein the first set of channel access parameters comprises a plurality of first channel access parameter identifiers and for each one of the plurality of first channel access parameter identifiers: a listen before talk (LBT) category for subsequent transmissions by the UE.

16. The wireless device of claim 15, wherein the LBT category comprises one of category 4 sensing, category 2 sensing, and category 1 immediate transmission.

17. The wireless device of claim 15, wherein the first set of channel access parameters further comprises for each of the plurality of first channel access parameter identifiers: at least one of a cyclic prefix (CP) extension indicator indicating whether the UE is expected to perform CP extension, a priority group, and an energy detection (ED) threshold.

18. The wireless device of claim 13, wherein the second set of channel access parameters comprises a plurality of second channel access parameter identifiers and for each of the plurality of second channel access parameter identifiers: a listen before talk (LBT) category for subsequent transmissions by the UE, and wherein the second set of channel access parameters further comprises for each one of the plurality of second channel access parameters identifiers: at least one of a cyclic prefix (CP) extension indicator indicating whether the UE is expected to perform CP extension, a priority group, and an energy detection (ED) threshold.

19. A method of operating a radio access network (RAN) node in a communication network, the method comprising:
transmitting an indication for determining a set of channel access parameters to a user equipment (UE);
wherein when the indication is transmitted in a downlink control information (DCI) message, the UE is requested to determine a first set of channel access parameters, and/or when the indication is transmitted in a random access response (RAR) message, the UE is requested to determine a second set of channel access parameters, wherein the second set of channel access parameters comprises a subset of the first set of channel access parameters, wherein the indication indicates an entry point in a common table of channel access parameters, the entry point being different depending on whether the indication is received in the DCI message or in the RAR message.

20. The method of claim 19, further comprising determining whether channel access parameters are to be signaled to the UE.

21. The method of claim 19, wherein the indication comprises a channel access parameter identifier, and wherein determining the first set of channel access parameters and/or the second set of channel access parameters is based on the channel access parameter identifier.

22. The method of claim 21, wherein the channel access parameter identifier is indicative of an entry point into the common table of channel access parameters.

23. A radio access network (RAN) node configured to operate in a communication network, the RAN node comprising:
processing circuitry; and
memory coupled with the processing circuitry, wherein the memory includes instructions that when executed by the processing circuitry causes the RAN node to perform operations comprising:
transmitting an indication for determining a set of channel access parameters to a user equipment (UE);
wherein when the indication is transmitted in a downlink control information (DCI) message, the UE is requested to determine a first set of channel access parameters, and/or when the indication is transmitted in a random access response (RAR) message, the UE is requested to determine a second set of channel access parameters, wherein the second set of channel access parameters comprises a subset of the first set of channel access parameters, wherein the indication indicates an entry point in a common table of channel access parameters, the entry point being different depending on whether the indication is received in the DCI message or in the RAR message.

24. The RAN node of claim 23, wherein the memory includes instructions that when executed by the processing circuitry causes the wireless device to perform operations further comprising determining whether channel access parameters are to be signaled to the UE.

25. The RAN node of claim 23, wherein the indication comprises a channel access parameter identifier, and wherein determining the first set of channel access parameters and/or the second set of channel access parameters is based on the channel access parameter identifier.

* * * * *